(12) United States Patent
Zewail et al.

(10) Patent No.: US 12,745,246 B2
(45) Date of Patent: Sep. 22, 2026

(54) BANDWIDTH SWITCHING FOR PHYSICAL DOWNLINK SHARED CHANNEL TRANSMISSIONS WITH SHARED DEMODULATION REFERENCE SIGNALS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 520 days.

(21) Appl. No.: 18/363,499

(22) Filed: Aug. 1, 2023

(65) Prior Publication Data

US 2025/0048361 A1 Feb. 6, 2025

(51) Int. Cl.

*H04W 4/00* (2018.01)
*H04L 5/00* (2006.01)
*H04W 72/1273* (2023.01)
*H04W 72/232* (2023.01)

(52) U.S. Cl.

CPC ....... *H04W 72/1273* (2013.01); *H04L 5/0051* (2013.01); *H04W 72/232* (2023.01)

(58) Field of Classification Search

None
See application file for complete search history.

(56) References Cited

U.S. PATENT DOCUMENTS

2019/0215900 A1* 7/2019 Pan ........................ H04W 72/23
2021/0243793 A1 8/2021 Ang et al.
2021/0409174 A1* 12/2021 Yum ..................... H04L 5/0048

FOREIGN PATENT DOCUMENTS

DE 102021110664 A1 10/2021
WO WO-2020160543 A1 * 8/2020 ............ H04W 72/23

OTHER PUBLICATIONS

Intel Corporation: "Resource Sharing Between PDCCH and PDSCH", R1-1716307, 3GPP TSG RAN WG1 Meeting NR#3, Intel Dynamic Resource Sharing, 3rd Generation Partnership Project, Mobile Competence Centre, 650, Route Des Lucioles, F-06921 Sophia-antipolis Cedex, France vol. RAN WG1, No. Nagoya, Japan, Sep. 18, 2017-Sep. 21, 2017, Sep. 17, 2017, XP051339763, pp. 1-5.
International Search Report and Written Opinion—PCT/US2024/032642—ISA/EPO—Oct. 8, 2024.

* cited by examiner

*Primary Examiner* — Zewdu A Beyen
(74) *Attorney, Agent, or Firm* — Polsinelli

(57) ABSTRACT

Systems and techniques are provided for wireless communication. A process can include determining an updated bandwidth corresponding to a scheduled physical downlink shared channel (PDSCH) transmission, wherein the scheduled PDSCH transmission is associated with a physical downlink control channel (PDCCH) transmission. The PDSCH transmission and the PDCCH transmission can be associated with a shared configured DMRS. The process can include receiving, based on the shared configured DMRS, the scheduled PDSCH transmission using the updated bandwidth.

27 Claims, 15 Drawing Sheets

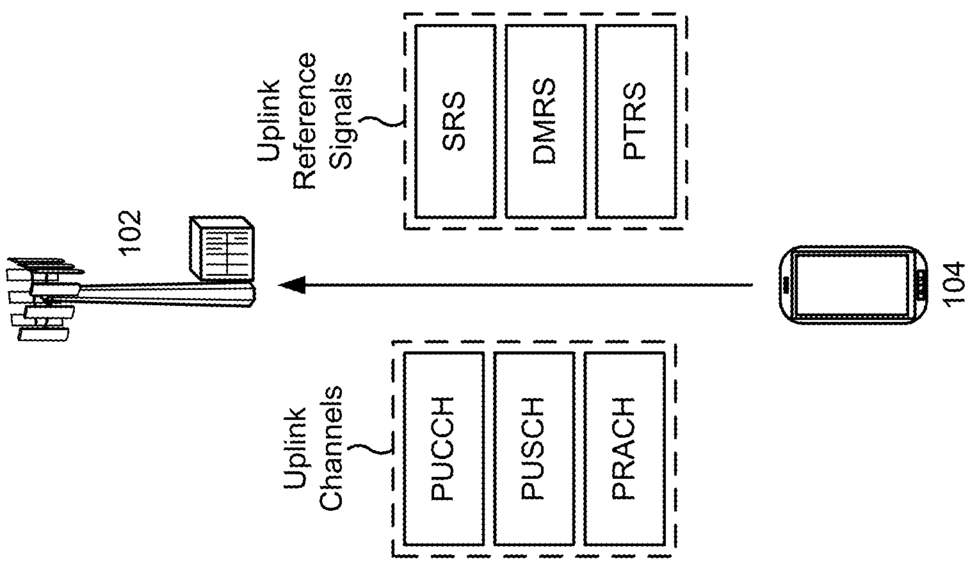
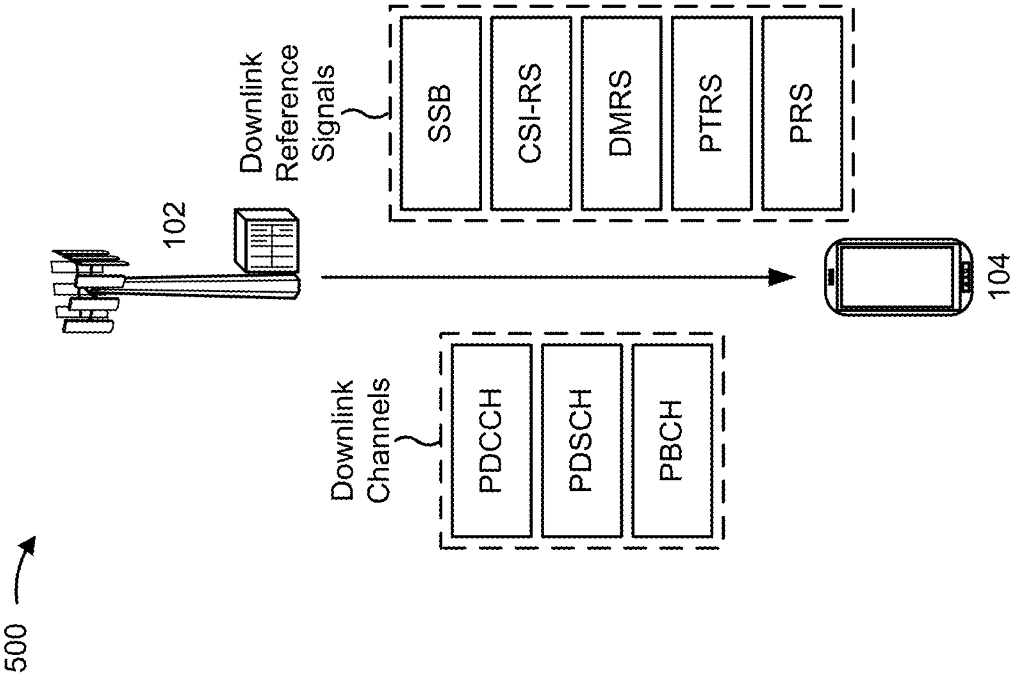
FIG. 5

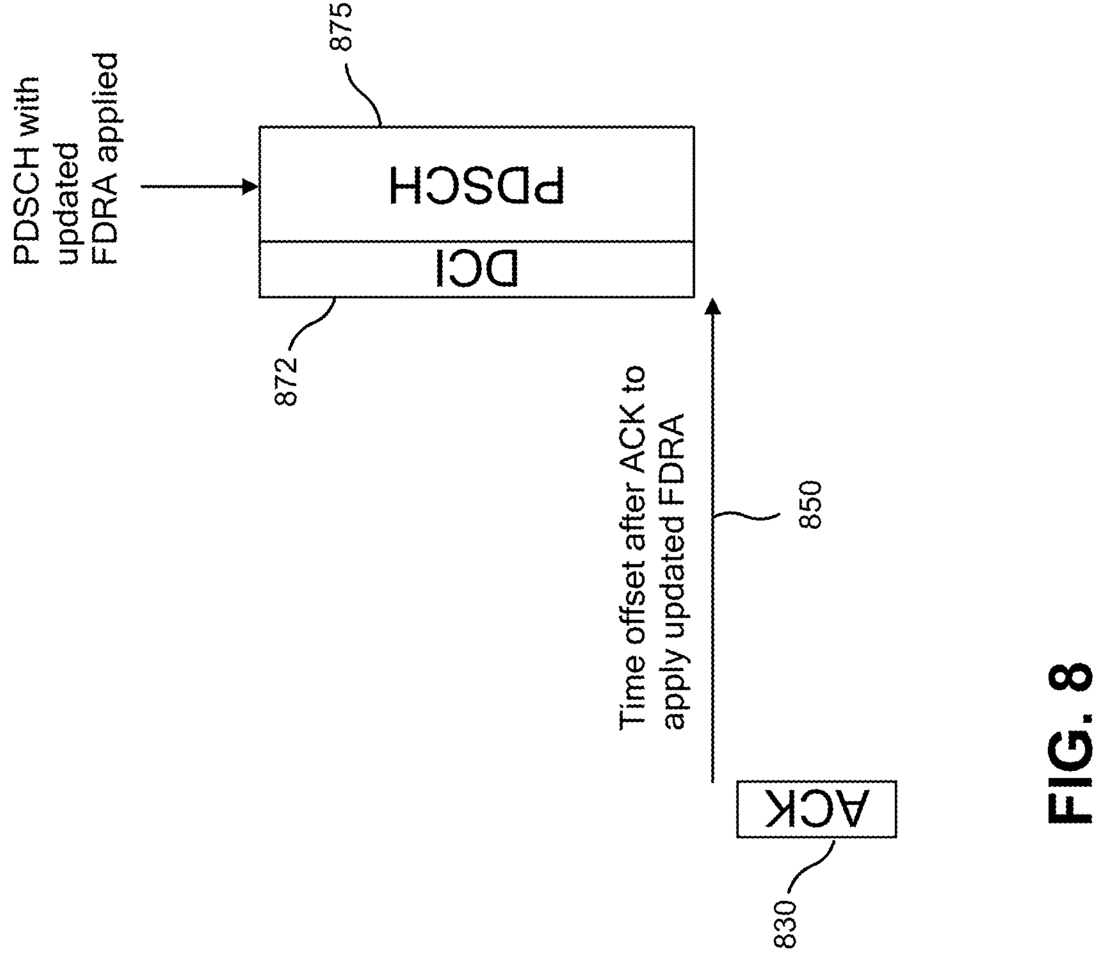
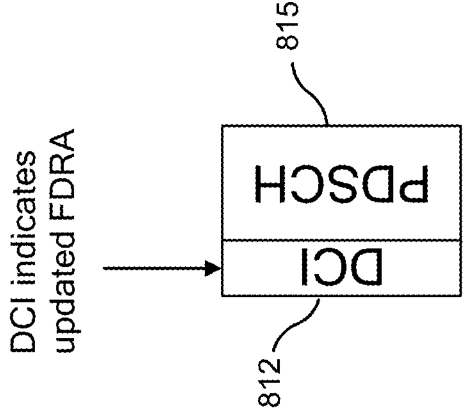
800
FIG. 8

1000b
FDRA0
FDRA1
FDRA2
1053
1055
1063
1065
1067
1075
1077

1000a
FDRA0
FDRA1
1010
1023
1025
1027

1300

Determine An Updated Bandwidth Corresponding To A Scheduled Physical Downlink Shared Channel (PDSCH) Transmission, Wherein The Scheduled PDSCH Transmission Is Associated With A Physical Downlink Control (PDCCH) Transmission, And Wherein The PDSCH Transmission And The PDCCH Transmission Are Associated With A Shared Configured DMRS
1302

Receive, Based On The Shared Configured DMRS, The Scheduled PDSCH Transmission Using The Updated Bandwidth
1304

FIG. 13

BANDWIDTH SWITCHING FOR PHYSICAL DOWNLINK SHARED CHANNEL TRANSMISSIONS WITH SHARED DEMODULATION REFERENCE SIGNALS

FIELD

Aspects of the present disclosure generally relate to wireless communication. In some implementations, examples are described for bandwidth updates for a physical downlink shared channel (PDSCH) transmission associated with a shared configured demodulation reference signal (DMRS).

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method of wireless communication performed at a network entity is provided. The method includes: determining an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); and receiving, based on the shared configured DMRS, the scheduled PDSCH transmission using the updated bandwidth.

In another illustrative example, an apparatus of a network entity for wireless communication is provided. The apparatus includes at least one memory and at least one processor coupled to the at least one memory and configured to: determine an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); and receive, based on the shared configured DMRS, the scheduled PDSCH transmission using the updated bandwidth.

In another illustrative example, a non-transitory computer-readable storage medium comprising instructions stored thereon which, when executed by at least one processor, causes the at least one processor to: determine an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); and receive, based on the shared configured DMRS, the scheduled PDSCH transmission using the updated bandwidth.

In another illustrative example, an apparatus is provided for wireless communication. The apparatus includes: means for determining an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); and means for receiving, based on the shared configured DMRS, the scheduled PDSCH transmission using the updated bandwidth.

According to at least one illustrative example, a method of wireless communication performed at a network entity is provided. The method includes: determining an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); transmitting configuration information indicative of the updated bandwidth; and transmitting the scheduled PDSCH transmission using the updated bandwidth.

In another illustrative example, an apparatus of a network entity for wireless communication is provided. The apparatus includes at least one memory and at least one processor coupled to the at least one memory and configured to: determine an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); transmit configuration information indicative of the updated bandwidth; and transmit the scheduled PDSCH transmission using the updated bandwidth.

In another illustrative example, a non-transitory computer-readable storage medium comprising instructions stored thereon which, when executed by at least one processor, causes the at least one processor to: determine an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); transmit configuration information indicative of the updated bandwidth; and transmit the scheduled PDSCH transmission using the updated bandwidth.

In another illustrative example, an apparatus is provided for wireless communication. The apparatus includes: means for determining an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); means for transmitting configuration information indicative of the updated bandwidth; and means for transmitting the scheduled PDSCH transmission using the updated bandwidth.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of physical channels and reference signals in a wireless network, in accordance with some examples;

FIG. 8 is a diagram illustrating an example of an updated Frequency Domain Resource Allocation (FDRA) starting time based on an acknowledgement (ACK) and a time offset from the ACK, in accordance with some examples;

FIG. 13 is a flow diagram illustrating an example of a process for wireless communication, in accordance with some examples;

DETAILED DESCRIPTION

Figure 1:
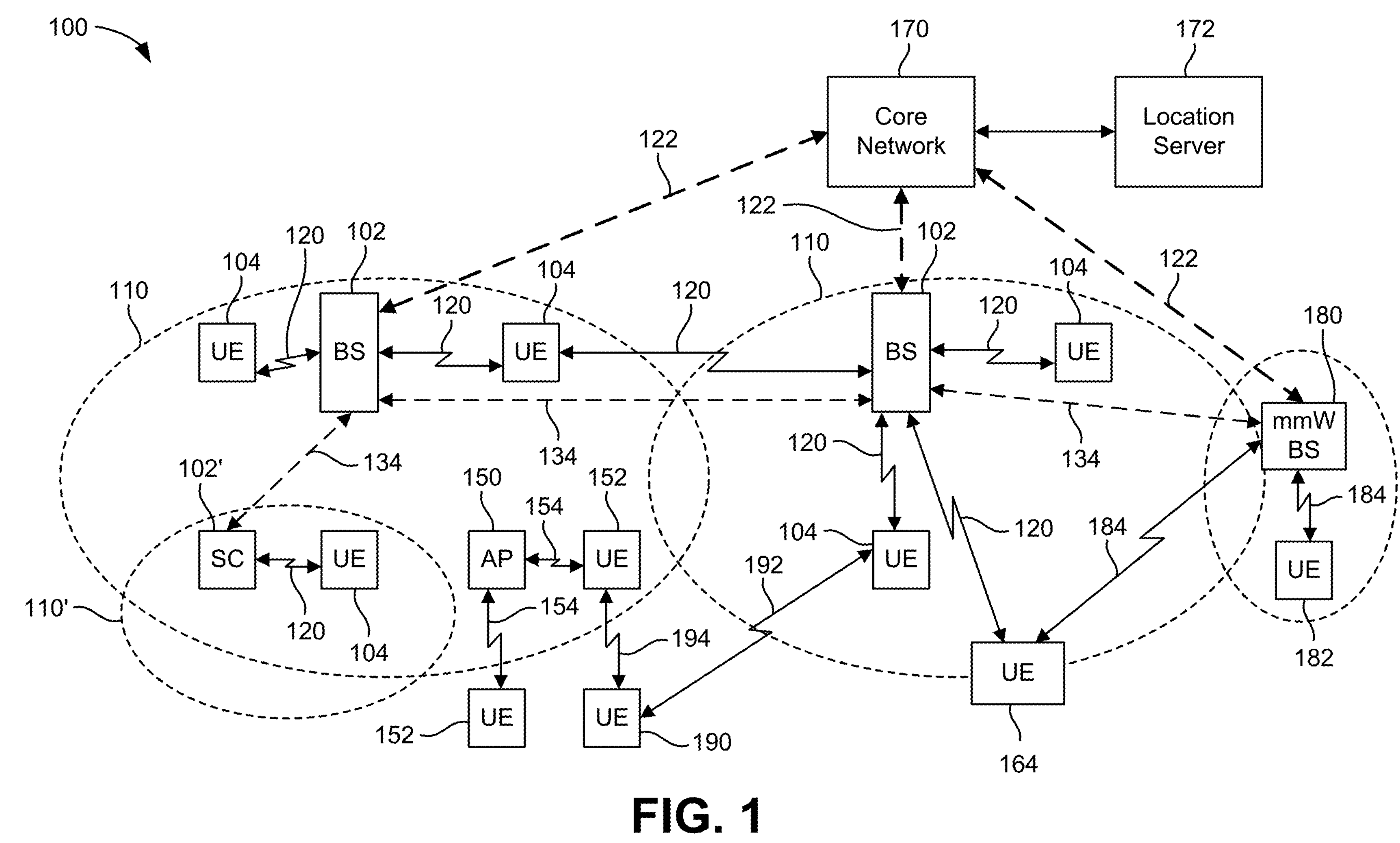
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In various wireless communication networks, physical channels can correspond to sets of time-frequency resources used for transmission of particular transport channel data, control information, or indicator information. For instance, each transport channel can be mapped to a corresponding physical channel. The physical downlink shared channel (PDSCH) may carry and/or be used to communicate user data and paging information to a user equipment (UE) or other terminal. The physical downlink control channel (PDCCH) may carry and/or be used to communicate control information, including scheduling decisions for PDSCH reception, and/or for scheduling grants enabling transmission on the physical uplink shared channel (PUSCH), etc.

In 4G/LTE and 5G/NR, PDCCH and PDSCH transmissions may be associated with separate time-division multiplexing (TDM) and/or frequency-division multiplexing (FDM) resources. For instance, a first set of time-frequency resources can be used for PDCCH transmissions and a second set of time-frequency resources can be used for PDSCH transmissions, where the first and second sets are non-overlapping (e.g., a respective time-frequency resource may be included in the first set or the second set, but not both sets).

Figures 6A, 6B:
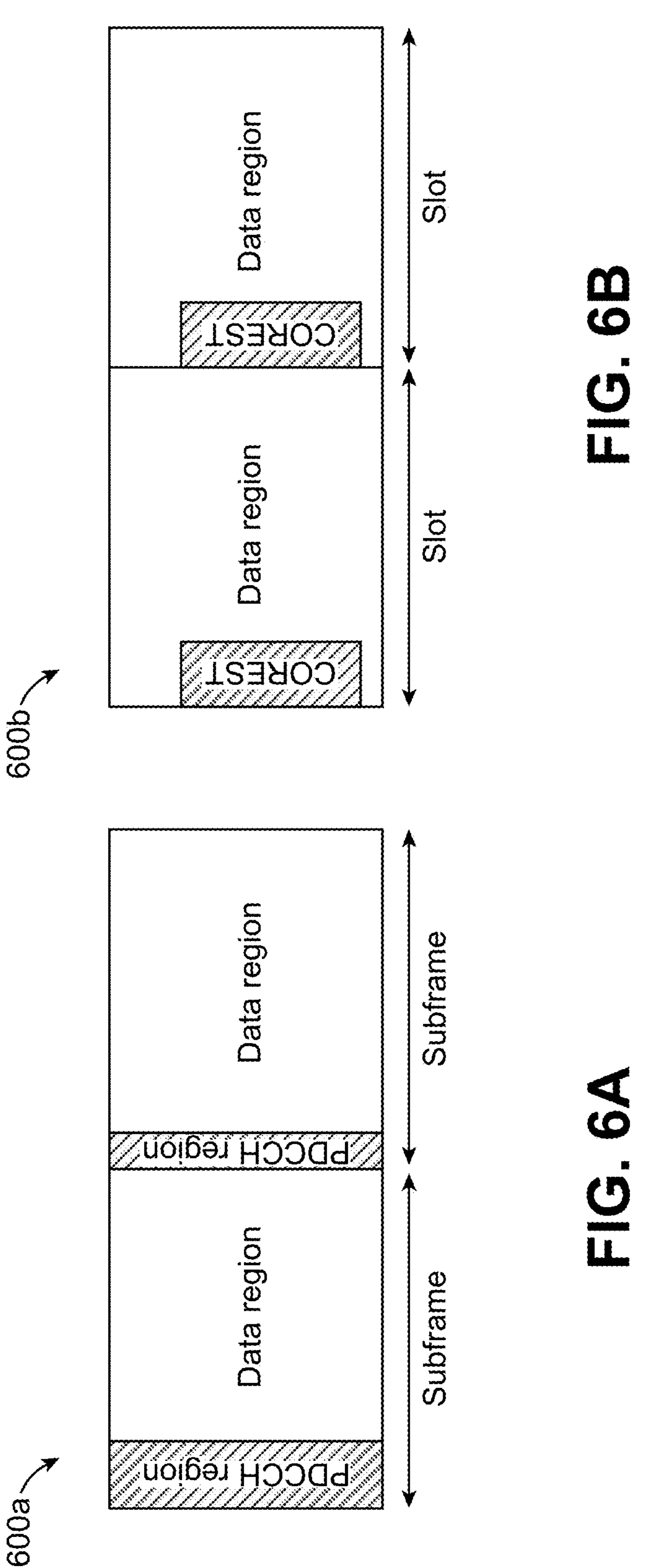
FIGS. 6A and 6B are diagrams illustrating examples of physical channels in time division multiplexing (TDM) and frequency division multiplexing (FDM) resources of a wireless network, in accordance with some examples.

In 4G/LTE, PDCCH transmissions may occur at the beginning of a slot or subframe (e.g., TDM with PDSCH). For example, FIG. 6A is a diagram 600*a* illustrating a time-frequency resource allocation (e.g., horizontal time axis, vertical frequency axis) corresponding to two example subframes each including a PDCCH region followed by a respective data region (e.g., a respective PDSCH region). A PDCCH region may also be referred to as a "control region" and a PDSCH region may also be referred to as a "data region." In some examples, a PDCCH transmission can occupy between one to three orthogonal frequency-division multiplexing (OFDM) symbols (e.g., dynamically indicated by a physical control format indicator channel (PCFICH) transmission). In some cases, a base station (e.g., eNB, etc.) can determine or configure the amount of PDCCH resources in a slot, for example based on a respective control load associated with a PDCCH transmission in the slot.

In 5G/NR, PDCCH transmissions may utilize corresponding resources (e.g., allocated PDCCH resources) within a control resource set. The control resource set is also referred to as "CORESET," and can refer to a set of physical time-frequency resources associated with transmitting PDCCH and/or downlink control information (DCI). In 5G/NR, PDCCH transmissions utilizing CORESET resources can be implemented based on TDM and/or FDM with PDSCH transmissions. In some cases, PDSCH resource allocation is performed to avoid overlapping with the CORESET (e.g., one or more time-frequency resources allocated for PDSCH transmission(s) are different from and non-overlapping with the CORESET time-frequency resources). For example, FIG. 6B is a diagram 600*b* illustrating a time-frequency resource allocation corresponding to two example slots each including a CORESET and a data region. The data region may also be referred to as a PDSCH region (e.g., a PDSCH resource allocation). In some cases, a PDSCH resource allocation can overlap with the CORESET, for example based on rate matching around the PDCCH (e.g., within the CORESET) that carries the DL grant scheduling the PDSCH. Rate matching around the corresponding PDCCH that schedules the PDSCH can be optimized for resource allocation where the CORESET includes a single grant (e.g., the DL grant scheduling the PDSCH).

The 5G/NR spectrum resources specified in the 3GPP protocol can be separated into two different frequency ranges, Frequency Range 1 (FR1) and Frequency Range 2 (FR2). FR1 and FR2 can also be referred to as frequency range specifications. FR1 corresponds to the sub-6 Gigahertz (GHz) frequency range, and can include frequencies from 450 MHz-6 GHz. Low and mid-band frequencies within FR1 can travel relatively long distances with better obstacle penetration (e.g., better coverage indoors, etc.) than higher-frequency bands. FR2 corresponds to frequencies from 24.25 GHz-52.60 GHz, and is also referred to as the mmWave band. FR2 may provide greater bandwidth and/or lower latency than FR1, but may also have a shorter range and lower ability to penetrate buildings and other solid obstacles.

FR1 frequency bands may utilize FDD or TDD duplex mode. FR2 frequency bands use analog beamforming (e.g., FR2 has analog beam restriction), and utilize the TDD duplex mode. For instance, the use of analog beamforming in FR2 corresponds to a low probability of different UEs to be served (e.g., with traffic) in the same analog beam. Based on the low probability, the different UEs are not served using FDM (e.g., with a single array). Instead, TDM is used to serve different UEs on the FR2 frequency bands (and/or space division multiplexing (SDM) when multiple panels or arrays are utilized). The FR2 frequency bands are additionally associated with a relatively large subcarrier spacing (SCS) and a relatively short symbol/slot duration.

The CORESET is a collection of resources (e.g., time-frequency resources) that can be shared by multiple PDCCH transmissions targeting multiple UEs. The sharing of CORESET resources for multiple PDCCH transmissions can be based on increasing control capacity and flexibility (e.g., to send DCIs to multiple UEs with different geometry and using different aggregation levels, etc.). Different UEs may additionally be associated with different channel realization information. In existing techniques, a demodulation reference signal (DMRS) is self-contained within each PDCCH transmission and precoding can be separately selected for each DCI.

The design of CORESET is optimized to support multiple UE DCI transmission (e.g., transmitting a DCI to multiple UEs), as noted above. The support multiple UE DCI transmission, the 3GPP specification provides that the PDCCH transmission carrying a DCI may also include a self-contained DMRS (e.g., allowing precoding to be separately selected for each DCI).

The optimization of the CORESET to the multiple UE DCI transmission use case corresponds to 5G/NR implementations that use FR1, as the FR2 analog beam restriction results in a very low probability for multiple UEs to be in the same analog beam. There is a need for systems and techniques that can be used to provide PDCCH/PDSCH multiplexing optimized for FR2 and/or frequencies greater than FR2. For instance, there is a need for PDCCH/PDSCH multiplexing that can be used to transmit one or more DCIs to the same UE, where shared precoding and/or beamforming can be used for the one or more DCIs and/or between the PDCCH and PDSCH.

Systems, apparatuses, processes (also referred to as methods), and computer-readable media (collectively referred to as "systems and techniques") are described herein that can be used to update a PDSCH bandwidth for a PDSCH transmission that shares a configured DMRS with a PDCCH transmission. In some examples, a bandwidth allocation for the scheduled PDSCH transmission (e.g., also referred to as a "PDSCH bandwidth") can be the same as a bandwidth allocation for the PDCCH transmission that schedules the PDSCH (e.g., also referred to as a "PDCCH bandwidth"). The PDSCH bandwidth can also be the same as the bandwidth of the shared configured DMRS associated with the PDSCH and PDCCH (e.g., the DMRS bandwidth can be the same as the PDCCH bandwidth, which can be the same as the PDSCH bandwidth).

In some cases, the PDSCH bandwidth may be changed and/or updated based on a pathloss between a network entity and UE. For instance, an updated PDSCH bandwidth can be determined based on a pathloss between a network entity and a UE, where the UE receives the PDCCH, configured shared DMRS, and PDSCH from the network entity. For example, a UE that is further away from the network entity (e.g., base station, gNB, etc.) may be updated to utilize a narrower bandwidth to receive the PDSCH corresponding to the configured shared DMRS and/or PDCCH. In another example, a UE that is closer to the network entity (e.g., base station, gNB, etc.) may be updated to utilize a wider bandwidth to receive the PDSCH corresponding to the configured shared DMRS and/or PDCCH.

In some aspects, where a relatively small packet size is associated with the PDSCH transmission from the network entity to the UE, the PDSCH bandwidth can be kept the same (e.g., a PDSCH update is not performed), and a shorter Time Domain Resource Allocation (TDRA) can be utilized for receiving the PDSCH transmission from the network entity. In some examples, the systems and techniques can be used to implement an updated PDSCH bandwidth for receiving a PDSCH transmission using a configured shared DMRS associated with the PDCCH transmission that scheduled the PDSCH transmission. For instance, in some aspects the systems and techniques can implement the updated PDSCH bandwidth based on configuring an updated Frequency Domain Resource Allocation (FDRA) for the UE. In some aspects, the updated PDSCH bandwidth can be updated without the network entity transmitting an updated FDRA field and/or updated FDRA information to the UE.

In some cases, an updated PDSCH bandwidth for a PDSCH sharing a configured DMRS with a PDCCH can be implemented based on one or more semi-static bandwidth configurations. In some examples, a downlink (DL) bandwidth part (BWP) can be reused for the updated PDSCH bandwidth directly. In another example, the UE can receive a Radio Resource Control (RRC) message and/or an RRC configuration indicative of the updated PDSCH bandwidth for the UE. In some examples, the UE can receive configuration information (e.g., from a network entity associated with the UE) indicative of a plurality of candidate PDSCH bandwidths. The UE can receive (e.g., transmitted by the network entity) bandwidth switching information indicative of a particular candidate PDSCH bandwidth from the plurality of configured candidate PDSCH bandwidths. Based on the bandwidth switching information, the UE can update the PDSCH bandwidth for receiving the scheduled PDSCH transmission. In some examples, the bandwidth switching information can be a Media Access Control (MAC)-Control Element (MAC-CE) and/or can include Downlink Control Information (DCI).

In some examples, an updated PDSCH bandwidth for a PDSCH sharing a configured DMRS with a PDCCH can be implemented based on dynamic switching of the PDSCH bandwidth. For instance, the updated PDSCH bandwidth can be based on a DCI that includes and/or is indicative of FDRA information (e.g., updated FDRA information) for the UE. The UE can receive the DCI from a network entity (e.g., base station, gNB, etc.). The UE can apply the updated FDRA at a FDRA starting time that is later than when the UE receives the DCI indicative of the updated FDRA. For instance, the UE may receive a DL grant DCI that includes a FDRA field indicative of an updated FDRA for the PDSCH bandwidth of the UE. The UE does not apply the updated FDRA to the current DL grant, and waits to apply the updated FDRA to PDSCH transmissions received starting from a later time. The later time can be based on a configured time offset from the UE receiving the DL grant DCI including the FDRA field indicative of the updated FDRA. In some cases, the time offset can be from the beginning or end of the DL grant in which the DCI including the updated FDRA field information was received by the UE.

In some cases, the time offset can be determined relative to an acknowledgement (ACK) or negative acknowledgement (NACK) corresponding to the DL grant. For instance, the time offset can be a configured time offset in units of slots (e.g., three slots, etc.) or in units of absolute time (e.g., 3 ms, etc.). In some aspects, the UE can be configured with a default FDRA corresponding to a default PDSCH bandwidth. The UE may utilize the default FDRA at least some PDCCH monitoring occasions to allow the network entity to successfully transmit (e.g., and to allow the UE to successfully receive) in instances where the UEs understanding of the currently active FDRA is incorrect or otherwise is different from the currently active FDRA that is used by the network entity for the PDCCH transmission of the PDCCH monitoring occasion. In some examples, the default FDRA and a corresponding periodicity (e.g., periodic pattern or interval for applying the default FDRA at the UE) can be configured at the UE and by the network entity. In another example, the UE can be configured (e.g., by the network entity) with a default FDRA and a corresponding timer value for the default FDRA. If the timer value (e.g., timer interval) expires, the UE can perform fallback to the default FDRA. The default FDRA timer can be reset at the UE based on receiving a valid control using the currently active FDRA information of the UE (e.g., the default FDRA timer can be reset based on the UE successfully receiving a PDCCH or PDSCH using the currently active FDRA at the UE).

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)—capable device, a network controller, an apparatus, a device, a computing system, an integrated access and backhauling (IAB) node, a DU, a CU, a RU (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 108. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, network node, apparatus, device, computing system, or the like may include disclosure of the UE, base station, network node, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
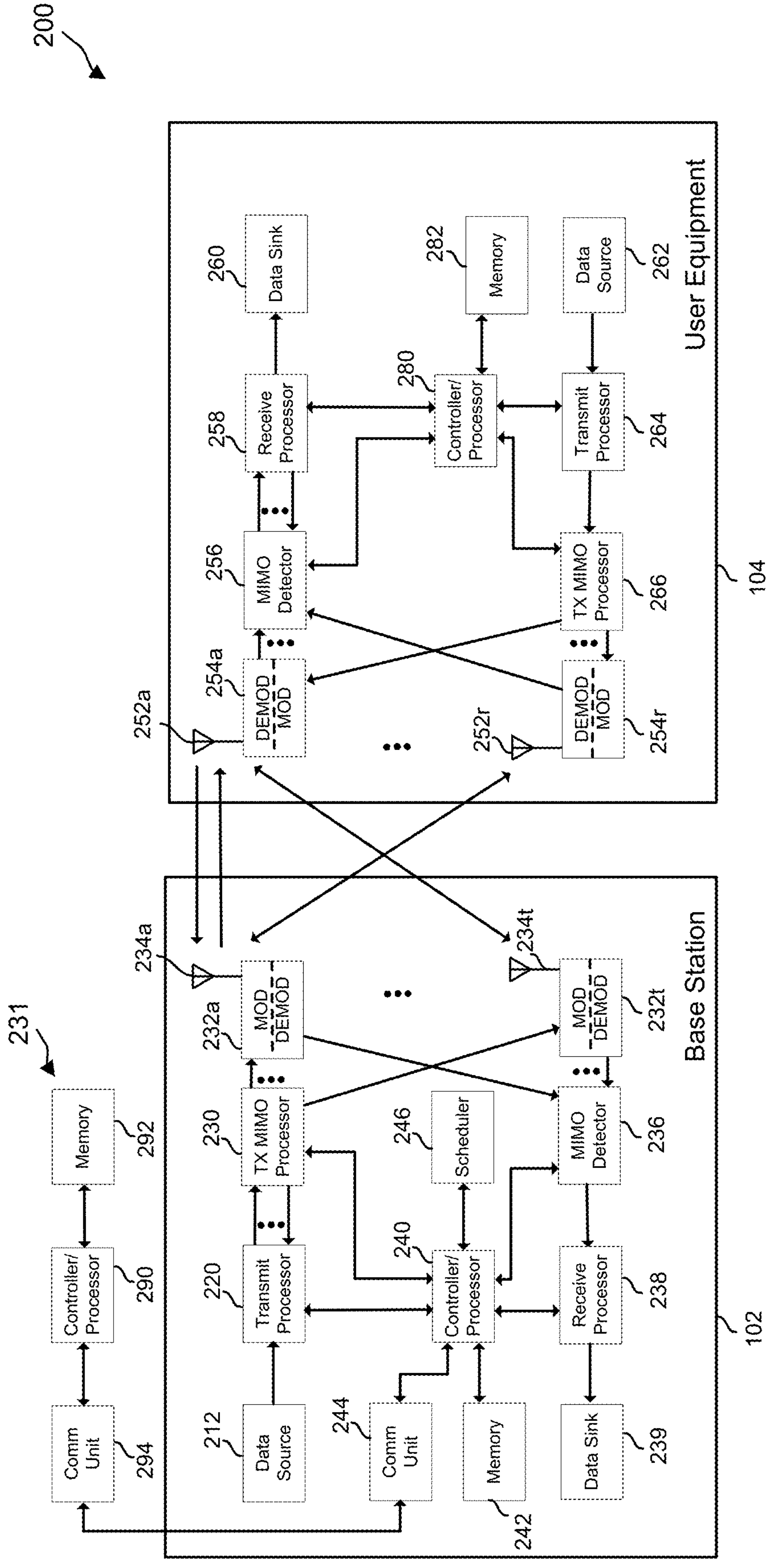
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234_a_ through 234_t_, and UE 104 may be equipped with R antennas 252_a_ through 252_r_, where in general $T \geq 1$ and $R \geq 1$.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (Mods) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream (e.g., for an orthogonal frequency-division multiplexing (OFDM) scheme and/or the like) to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to one or more demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
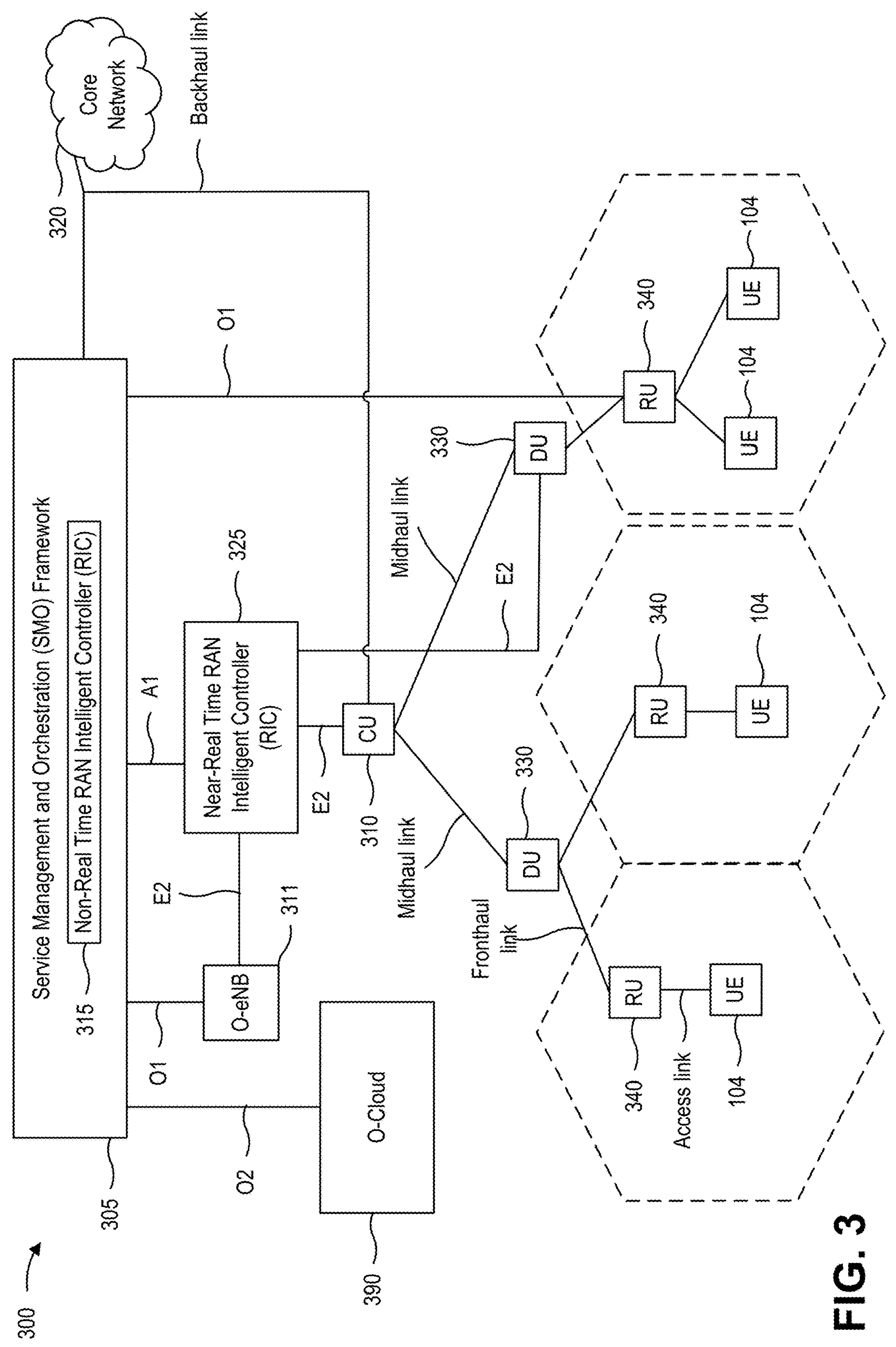
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUs 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
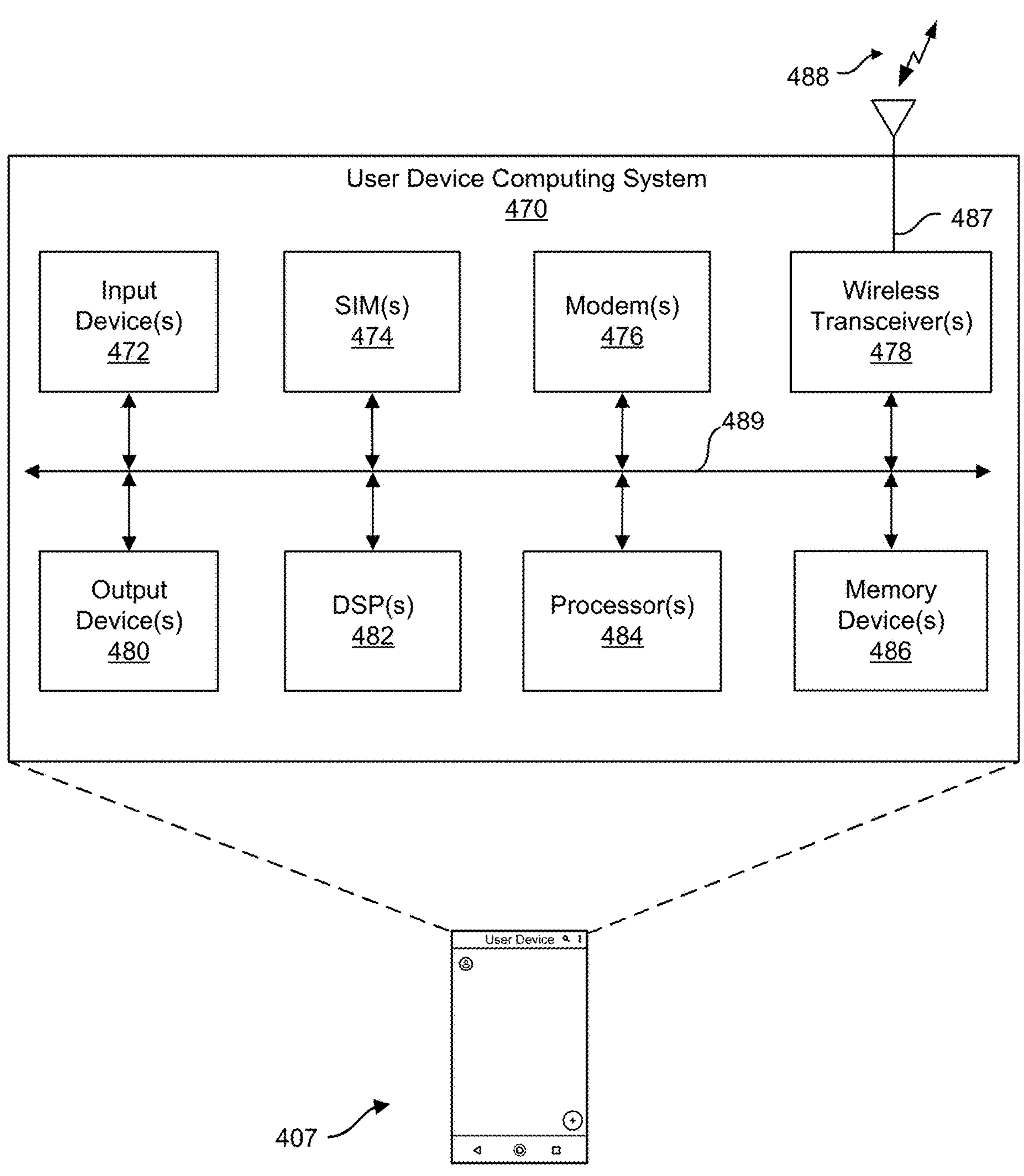
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR)

device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

FIG. 5 is a diagram illustrating an example 500 of physical channels and reference signals in a wireless network. In some examples, one or more downlink channels and one or more downlink reference signals may carry information from a base station 102 to a UE 104. One or more uplink channels and one or more uplink reference signals may carry information from UE 104 to base station 102.

In some aspects, a downlink channel may include one or more of a physical downlink control channel (PDCCH) that carries downlink control information (DCI), a physical downlink shared channel (PDSCH) that carries downlink data, and/or a physical broadcast channel (PBCH) that carries system information, among other examples. In some aspects, PDSCH communications may be scheduled by PDCCH communications.

In some examples, an uplink channel may include one or more of a physical uplink control channel (PUCCH) that carries uplink control information (UCI), a physical uplink shared channel (PUSCH) that carries uplink data, and/or a physical random access channel (PRACH) used for initial network access, among other examples. In some aspects, UE 104 may transmit acknowledgement (ACK) or negative acknowledgement (NACK) feedback (e.g., ACK/NACK feedback or ACK/NACK information) in UCI on the PUCCH and/or the PUSCH.

In some cases, a downlink reference signal may include one or more of a synchronization signal block (SSB), a channel state information (CSI) reference signal (CSI-RS), a demodulation reference signal (DMRS), a positioning reference signal (PRS), and/or a phase tracking reference signal (PTRS), among other examples. In some examples, an uplink reference signal may include one or more of a sounding reference signal (SRS), a DMRS, and/or a PTRS, among other examples.

An SSB may carry or include information used for initial network acquisition and synchronization. For example, an SSB can carry or include one or more of a primary synchronization signal (PSS), a secondary synchronization signal (SSS), a PBCH, and/or a PBCH DMRS. An SSB may also be referred to as a synchronization signal/PBCH (SS/PBCH) block. In some aspects, base station 102 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. For example, base station 102 can configure a set of CSI-RSs for UE 104, and UE 104 can measure the configured set of CSI-RSs. Based on the CSI-RS measurements, UE 104 can perform channel estimation and report channel estimation parameters to base station 102 (e.g., in a CSI report). For example, the channel estimation parameters can include one or more of a channel quality indicator (CQI), a precoding matrix indicator (PMI), a CSI-RS resource indicator (CRI), a layer indicator (LI), a rank indicator (RI), and/or a reference signal received power (RSRP), among other examples.

In some examples, base station 102 can use the CSI report to select transmission parameters for downlink communications to UE 104. For example, base station 102 can use the CSI report to select transmission parameters that include one or more of a quantity of transmission layers (e.g., a rank), a precoding matrix (e.g., a precoder), a modulation and coding scheme (MCS), and/or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS can carry information used to compensate for oscillator phase noise. In some cases, oscillator phase noise may increase as an oscillator carrier frequency increases. In some examples, a PTRS can be utilized at high carrier frequencies (e.g., such as millimeter wave frequencies) to mitigate oscillator phase noise. The PTRS may be used to track the phase of the local oscillator and to enable suppression of phase noise and common phase error (CPE). As illustrated in FIG. 5, in some examples one or more PTRSs can be used for both downlink communications (e.g., on the PDSCH) and uplink communications (e.g., on the PUSCH).

A PRS may carry information associated with timing or ranging measurements of UE 104. For example, UE 104 may utilize one or more signals (e.g., PRSs) transmitted by base station 102 to improve an observed time difference of arrival (OTDOA) positioning performance. In some examples, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). A PRS can be designed to improve detectability by UE 104, which may need to detect downlink signals from multiple neighboring base stations in order to perform OTDOA-based positioning. Accordingly, UE 104 may receive a PRS from multiple cells (e.g., a reference cell and one or more neighbor cells), and may report a reference signal time difference (RSTD) based on OTDOA measurements associated with the PRSs received from the multiple cells. In some aspects, base station 102 can calculate a position of UE 104 based on the RSTD measurements reported by UE 104.

In some examples, an SRS can carry information used for uplink channel estimation, which may be used for scheduling, link adaptation, precoder selection, and/or beam management, among other examples. Base station 102 can configure one or more SRS resource sets for UE 104, and UE 104 can transmit SRSs on the configured SRS resource sets. An SRS resource set may have a configured usage, such as uplink CSI acquisition, downlink CSI acquisition for reciprocity-based operations, uplink beam management, among other examples. Base station 102 may measure the SRSs, may perform channel estimation based on the measurements, and/or may use the SRS measurements to configure communications with UE 104.

As noted previously above, systems and techniques are described herein that can be used to update a PDSCH bandwidth for a PDSCH transmission that shares a configured DMRS (e.g., also referred to as a "shared configured DMRS," a "configured shared DMRS," and/or a "shared DMRS") with a PDCCH transmission. For example, the PDSCH transmission can share the configured shared DMRS with a PDCCH transmission that schedules (e.g., scheduled) the PDSCH transmission. The shared configured DMRS can be a fixed DMRS associated with the PDCCH and PDSCH transmission. The fixed DMRS can be configured (e.g., by a network entity, such as a base station, gNB, etc., associated with the UE) based on a corresponding set of time-frequency resources and DMRS sequence. The PDSCH transmission can be scheduled by the PDCCH transmission (e.g., the PDCCH transmission can include a DCI indicative of a DL grant corresponding to or associated with the PDSCH). In some cases, the systems and techniques can be used to integrate PDCCH and PDSCH transmissions for higher frequency bands, such as 5G NR FR2 (e.g., mmWave) and/or provide improved resource utilization for PDCCH and PDSCH transmission on the higher frequency bands.

Figure 7B:
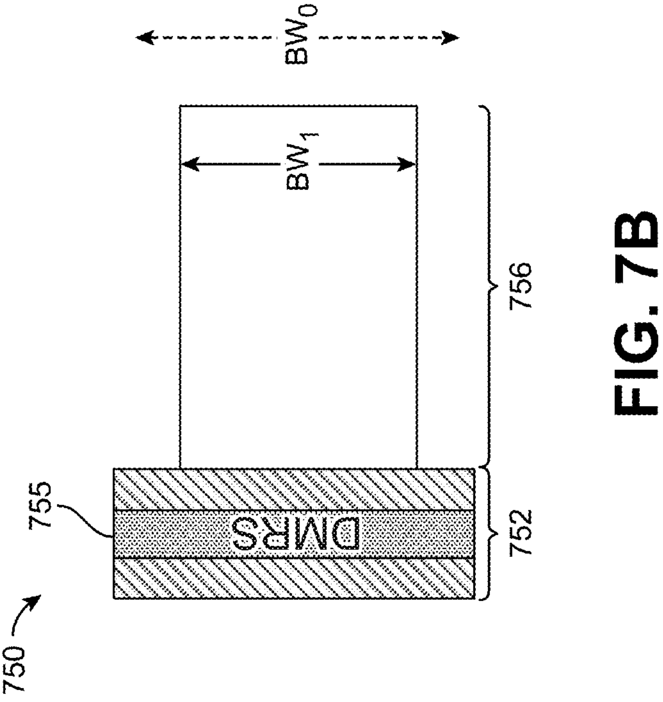
FIG. 7B is a diagram illustrating an example of a shared configured DMRS associated with a PDCCH and PDSCH, where the shared configured DMRS and the PDSCH have different respective bandwidths, in accordance with some examples.
Figure 7A:
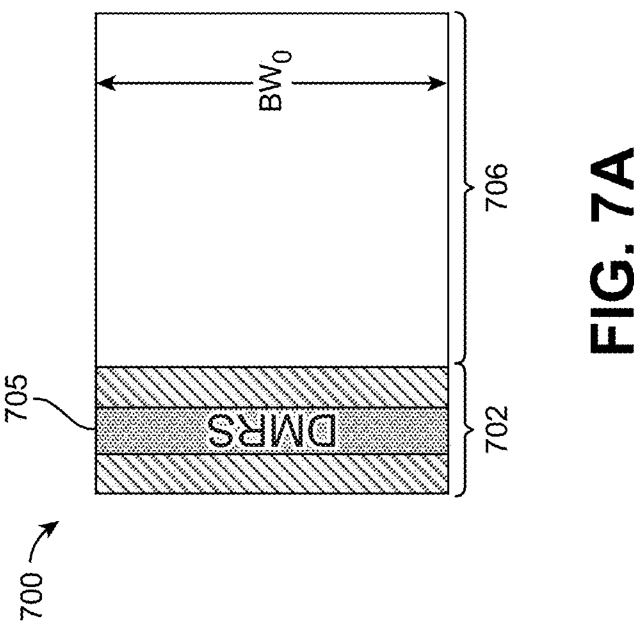
FIG. 7A is a diagram illustrating an example of a shared configured demodulation reference signal (DMRS) associated with a physical downlink communication channel (PDCCH) and a physical downlink shared channel (PDSCH), where the shared configured DMRS and the PDSCH have the same bandwidth, in accordance with some examples.

FIGS. 7A and 7B are diagrams illustrating examples of a shared configured DMRS associated with a PDCCH transmission and a PDSCH transmission. For example, FIG. 7A illustrates example time-frequency resources 700 associated with a shared configured DMRS that has the same bandwidth as the PDCCH transmission and the PDSCH transmission. FIG. 7B illustrates example time-frequency resources 750 associated with a shared configured DMRS that has a different bandwidth (e.g., an updated bandwidth relative to) than the shared configured DMRS and the PDCCH transmission.

As used herein, the phrase "a PDCCH" or "the PDCCH" may be used interchangeably with "a PDCCH transmission" or "the PDCCH transmission," respectively. The phrase "a PDSCH" or "the PDSCH" may be used interchangeably with "a PDSCH transmission" or "the PDSCH transmission," respectively. A PDCCH may also be referred to as "control information" and a PDSCH may also be referred to as a "scheduled downlink data transmission." For instance, a PDCCH that schedules a PDSCH can be referred to as control information indicative of a scheduled downlink data transmission.

FIGS. 7A and 7B illustrate respective sets of resource elements (REs) along a horizontal time axis and a vertical frequency axis. For example, FIG. 7A illustrates a first set of time/frequency REs 700 and FIG. 7B illustrates a second set of time/frequency REs 750. Each respective set of REs 700 and 750 includes a control region and a data region. The control region may also be referred to as a "PDCCH region" and the data region may also be referred to as a "PDSCH region." The control region (e.g., PDCCH region) includes a subset of the time-frequency resources included in the set of REs. The shared configured DMRS may be transmitted using a resource allocation within the PDCCH region (e.g., within the PDCCH transmission). Bandwidth can be represented by a height of each region and/or transmission on the vertical frequency axis. For instance, a wider bandwidth includes a larger number of individual frequency resources, and is taller on the vertical frequency axis than a narrower bandwidth that includes a lesser number of individual frequency resources.

In some cases, the control region (e.g., PDCCH region) may correspond to a subset of REs used to transmit (e.g., by a network entity, base station, gNB, etc.) and/or receive (e.g., by a UE) control information, such as a PDCCH. The data region (e.g., PDSCH region) may correspond to a subset of REs used to transmit and/or receive data information, such as a PDSCH.

For example, the set of REs 700 of FIG. 7A includes a control region 702 and a data region 706. The set of REs 750 of FIG. 7B includes a control region 752 and a data region 756. In some aspects, control region 702, 752 and data region 706, 756 may be non-overlapping, where a respective RE of the set of REs 700, 750 may be included in control region 702, 752 or may be included in data region 706, 756 but not both. In some aspects, FIGS. 7A and 7B illustrate example RE allocations for multiplexed PDCCH and PDSCH transmissions using a configured shared DMRS (e.g., the configured shared DMRS 705 of FIG. 7A, the configured shared DMRS 755 of FIG. 7B.

In the example of FIG. 7A, a bandwidth of the configured shared DMRS 705 can be the same as a bandwidth of the potentially allocated PDSCH 706 and can be the same as a bandwidth of the PDCCH 702. For instance, the configured shared DMRS 705, PDCCH 702, and PDSCH 706 can have the same bandwidth $BW_0$.

In the example of FIG. 7B, a bandwidth of the configured shared DMRS 755 can be the same as a bandwidth of the PDCCH 752 (e.g., $BW_0$), and can be larger (e.g., wider) than a bandwidth of the potentially allocated PDSCH 756 (e.g., $BW_1$). The narrower PDSCH 756 bandwidth, $BW_1$, may include a smaller number of frequency resources than the wider DMRS 755 bandwidth $BW_0$. The narrower PDSCH 756 bandwidth, $BW_0$, also includes a smaller number of frequency resources than the wider PDSCH 706 bandwidth $BW_0$.

In cases where the DMRS is not shared between a PDCCH and a corresponding PDSCH (e.g., PDSCH scheduled by the PDCCH), a UE may first search for the PDCCH within the CORESET (e.g., such as the CORESET shown in each of the two slots in the example 600*b* of FIG. 6B). In this example, the UE searches for the PDCCH within the CORESET and subsequently decodes the PDCCH before starting to decode the corresponding PDSCH scheduled by the PDCCH. Based on the PDCCH being decoded before the corresponding PDSCH, the PDCCH may be used to indicate the FDRA for the corresponding PDSCH. For example, the UE can decode the PDCCH and determine the FDRA for the PDSCH (e.g., the PDSCH bandwidth) before the UE is scheduled to receive the PDSCH (e.g., before the UE demodulates and decodes the PDSCH, based on the decoded FDRA from the earlier received PDCCH).

In examples where the PDCCH and the scheduled PDSCH share a configured DMRS (e.g., such as the example of the shared configured DMRS 705, 755 of FIGS. 7A, 7B respectively), the UE may perform blind channel estimation using an assumed DMRS that is the same as the configured shared DMRS 705 or 755 (e.g., the assumed DMRS is the shared configured DMRS 705, 755). For instance, the UE can search blindly for the configured shared DMRS 705 as a PDCCH DMRS within control region 702 of the resource grid 700, and can attempt to perform channel estimation and PDCCH decoding based on the blind search for configured shared DMRS 705. In the blind search and/or blind channel estimation, the UE assumes that a PDCCH DMRS is present on the control region 702 REs, and that the PDCCH DMRS will use the particular combination of time-frequency REs and DMRS sequence that correspond to configured shared DMRS 705.

Based on the blind channel estimation, the UE may detect configured shared DMRS 705 or may not detect configured shared DMRS 705. For instance, the UE may detect configured shared DMRS 705 as a PDCCH DMRS transmitted by a gNB to the UE. In some examples, the UE may not detect configured shared DMRS 705 if configured shared DMRS 705 was not transmitted by the gNB (e.g., if the gNB decides not to serve the UE, if the gNB decides to serve other UEs instead, etc.) For instance, after determining blind channel estimation information (e.g., performing successful blind channel estimation using a fixed DMRS), the UE can proceed with PDCCH demodulation and decoding using the determined blind channel estimation information (e.g., the UE can receive the PDCCH using the determined blind channel estimation information).

To perform demodulation (e.g., of a modulated PDCCH and/or a modulated PDSCH), the UE can use the blind channel estimation information to determine the particular REs to demodulate, and a demodulation order in which to demodulate the particular REs. To perform decoding (e.g., of a demodulated PDCCH and/or a demodulated PDSCH), the UE can use the blind channel estimation information to determine the particular REs or log likelihood ratios (LLRs) for each DCI hypothesis of one or more DCI hypotheses used for decoding. The UE can additionally perform decoding based on using the blind channel estimation information to determine a payload size for the DCI hypothesis. In some cases, the UE is not aware if the blind channel estimation is valid. For instance, the UE may be unaware of whether the blind channel estimation information is valid until the UE is able to successfully decode a PDCCH or PDSCH. If the UE utilizes the blind channel estimation for a particular fixed DMRS hypothesis and PDCCH or PDSCH decoding is not successful, the UE can determine that the particular fixed DMRS hypothesis does not correspond to the current DMRS (or, if all fixed DMRS hypotheses have been attempted for blind channel estimation, the UE can determine that none of the fixed DMRS hypotheses are valid, and therefore that no DMRS was transmitted by the network entity). Prior to the decoding step, the UE does not know if the blind channel estimation information is valid, as the DMRS may not have been transmitted, or may not have been transmitted towards the UE. The UE may additionally be unaware of how many DCIs are transmitted, and/or the aggregation levels of the transmitted DCIs, etc. In some examples, blind decoding is still needed (e.g., a fixed DMRS hypothesis can be used to receive a PDCCH/PDSCH based on performing blind channel estimation information for demodulation and subsequently performing blind decoding on the demodulation result).

The systems and techniques described herein can be used to update a PDSCH bandwidth without using the PDCCH that schedules the PDSCH transmission to indicate the FDRA and/or updated PDSCH bandwidth for the scheduled PDSCH transmission. For instance, the systems and techniques can be used to provide one or more semi-static configurations of PDSCH bandwidth based on DL BWP information and/or based on RRC configuration information. In another illustrative example, the systems and techniques can be used to provide dynamic switching (e.g., updating) of PDSCH bandwidth and/or corresponding FDRA information. For instance, the updated PDSCH bandwidth can be based on a DCI that includes and/or is indicative of FDRA information (e.g., updated FDRA information) for the UE.

In some examples, the systems and techniques can be used to update the PDSCH bandwidth from $BW_0$ of FIG. 7A to the narrower PDSCH bandwidth $BW_1$ of FIG. 7B. In another example, the systems and techniques can be used to update the PDSCH bandwidth from $BW_1$ of FIG. 7B to the wider PDSCH bandwidth $BW_0$ of FIG. 7A.

As noted previously, in some cases, the PDSCH bandwidth may be changed and/or updated (e.g., from wider PDSCH bandwidth $BW_0$ of FIG. 7A to narrower PDSCH bandwidth $PW_1$ of FIG. 7B, or vice versa) based on a pathloss between a network entity and UE. For instance, an updated PDSCH bandwidth can be determined based on a pathloss between a network entity and a UE, where the UE receives the PDCCH, configured shared DMRS, and PDSCH from the network entity. For example, a UE that is further away from the network entity (e.g., base station, gNB, etc.) may be updated to switch from the wider PDSCH bandwidth $BW_0$ of FIG. 7A to utilize the narrower PDSCH bandwidth $BW_1$ of FIG. 7B to receive the PDSCH 756 corresponding to the configured shared DMRS 755 and/or PDCCH 752. In another example, a UE that is closer to the network entity (e.g., base station, gNB, etc.) may be updated to switch from the narrower PDSCH bandwidth $BW_1$ of FIG. 7B to utilize the wider PDSCH bandwidth $BW_0$ of FIG. 7A to receive the PDSCH 706 corresponding to the configured shared DMRS 705 and/or PDCCH 702.

In one illustrative example, the systems and techniques can be used to provide PDSCH bandwidth switching using one or more semi-static configurations indicative of PDSCH bandwidth update information.

For example, in some aspects, an updated PDSCH bandwidth can be determined based on downlink (DL) bandwidth part (BWP) switching information. In some examples, the UE can receive the DL BWP switching information from a network entity, where the DL BWP switching information is indicative of and/or can be used by the UE to determine an updated PDSCH bandwidth. In some examples, where DL BWP switching information is used to indicate an updated PDSCH bandwidth for the UE, the UE may receive DCIs for DL grants that do not include a Frequency Domain Resource Allocation (FDRA) field. A DL grant DCI that does not include a FDRA field can be smaller in size than a DL grant DCI that does include a FDRA field. In some aspects, signaling an updated PDSCH bandwidth based on DL BWP switching information can reduce DCI message overhead between a network entity (e.g., base station, gNB, etc.) and a UE.

In some examples, the systems and techniques can utilize a BWP switching mechanism to change and/or update the PDSCH bandwidth. For instance, a UE can receive a Radio Resource Control (RRC) message indicative of one or more BWP bandwidth switching candidates. Each BWP bandwidth switching candidate may be an available BWP bandwidth, and may, for instance, be determined and/or configured by the network entity associated with the UE. In some aspects, the network entity can transmit, and the UE can receive, an RRC message that configures (e.g., pre-configures) the one or more available BWP bandwidths as the available or potential candidates for switching during the PDSCH bandwidth update. In some examples, the UE can select a particular BWP switching candidate from the configured plurality of BWP switching candidates. In another example, the UE can receive information and/or an additional message or transmission from the network entity that is indicative of the particular BWP switching candidate from the configured plurality of BWP switching candidates.

In another example, the network entity may transmit, and the UE may receive, an RRC message indicative of an RRC reconfiguration for changing BWP bandwidth. For instance, the network entity may transmit, and the UE may receive, an RRC reconfiguration message and/or RRC reconfiguration information corresponding to a DL BWP for determining an updated PDSCH bandwidth for the UE.

In another illustrative example of semi-static PDSCH bandwidth configuration, the network entity may transmit, and the UE may receive, a new RRC configuration corresponding to the updated PDSCH bandwidth. The new RRC configuration can be included in an additional RRC message transmitted by the network entity and received by the UE. In some cases, the additional RRC message is indicative of the new RRC configuration for PDSCH bandwidth. For instance, the new RRC configuration can indicate a new or updated PDSCH FDRA. In some examples, the new or updated PDSCH FDRA indicated by the new RRC configuration can be within the DL BWP currently utilized, configured, and/or allocated for the UE. In one illustrative example, the updated PDSCH FDRA can be located at the center of the DL BWP (e.g., the updated PDSCH FDRA uses the center portion(s) of the existing DL BWP).

In some aspects, a plurality of candidate PDSCH bandwidths can be configured (e.g., pre-configured and/or predefined) for the UE. For example, the plurality of candidate PDSCH bandwidths can be configured for the UE based on one or more RRC configurations and/or RRC messages transmitted by the network entity and received by the UE. In some cases, the network entity can transmit, and the UE can receive, a switching indication configured to cause the UE to switch between respective ones of the plurality of configured candidate PDSCH bandwidths. In some aspects, the switching indication can be a MAC-CE and/or MAC-CE-based message transmitted by the network entity and received by the UE. In some examples, the switching indication can be a DCI and/or DCI-based message transmitted by the network entity and received by the UE. In some aspects, configuring the plurality of candidate PDSCH bandwidths based on the RRC configuration information and/or RRC messages can reduce the DCI signaling overhead between the network entity and the UE, as the DCIs for DL grant do not need to include a FDRA field.

In another illustrative example, the systems and techniques can be used to provide PDSCH bandwidth switching using dynamic switching.

For example, a UE can receive (and a network entity can transmit) a DCI that includes and/or is indicative of FDRA information that can be applied by the UE to receive the PDSCH after a configured time has elapsed. In some aspects, the DCI can be a DL grant DCI and can include a FDRA field and/or can include FDRA information. The FDRA field and/or FDRA information can be indicative of the updated FDRA to be applied by the UE. The FDRA field and/or FDRA information can additionally be indicative of the time offset after which the updated FDRA can be applied. In some cases, the time offset can be pre-configured (e.g., pre-configured, pre-defined, etc.) by the network entity for the UE. In some cases, the time offset can be measured starting from the DL grant DCI. For instance, the time offset can be measured beginning from when the DL grant DCI is received, beginning from the end or expiration of the DL grant corresponding to the DL grant DCI, etc. The time offset may be configured based on a number of time slots (e.g., three slots, four slots, etc.). The time offset may be configured based on an amount or interval of absolute time (e.g., three milliseconds, four milliseconds, etc.).

In some examples, the DL grant DCI may include a FDRA field (e.g., FDRA information indicative of an updated FDRA corresponding to an updated PDSCH bandwidth) when the UE PDSCH bandwidth is being updated. For instance, if a UE is associated with a PDSCH bandwidth that is not to be updated (e.g., will stay the same for some future amount of time), the network entity can transmit, and the UE can receive, one or more DL grant DCI messages where the DCI does not include a FDRA field. In some aspects, the inclusion of a FDRA field in the DL grant DCI received from the network entity by the UE can be indicative of the presence of an updated PDSCH bandwidth upcoming for the UE and/or starting for one or more future scheduled PDSCH transmissions that will be received by the UE. In some aspects, the lack of a FDRA field in the DL grant DCI received from the network entity by the UE can indicate that the current PDSCH bandwidth and corresponding FDRA are not updated for the UE. A DL grant DCI with a FDRA field can be longer (e.g., larger in size) than a DL grant DCI without a FDRA field. Transmitting the DL grant DCI with the FDRA field only when an updated PDSCH bandwidth is signaled can reduce DCI overhead for the (relatively shorter) DL grant DCIs transmitted without a FDRA field when the current PDSCH bandwidth does not need to be updated.

In one illustrative example, the DL grant DCI received by a UE can include a FDRA field and/or FDRA information indicative of an updated FDRA. The updated FDRA corresponds to an updated PDSCH bandwidth for receiving a scheduled or potentially allocated PDSCH. In some aspects, the updated FDRA may be received in a first DL grant and is not applied until a future time (e.g., after the first DL grant in which the updated FDRA is received). Applying a FDRA can include using the FDRA to decode an incoming PDCCH transmission and/or an incoming PDSCH transmission. For instance, before an updated FDRA is applied (e.g., before the FDRA starting time of the updated FDRA), the UE may decode any incoming PDCCH and/or incoming PDSCH transmissions using the current FDRA and not the updated FDRA. After the updated FDRA is applied (e.g., at or after the FDRA starting time of the updated FDRA), the UE may decode any incoming PDCCH and/or incoming PDSCH transmissions using the updated FDRA. Decoding incoming PDCCH and/or PDSCH transmission using a FDRA (e.g., such as an updated FDRA) can be based on using the FDRA to determine the particular REs (e.g., time-frequency resources) of the resource grid will be used.

In one illustrative example, a DL grant DCI received by the UE includes a FDRA field and/or is indicative of updated FDRA information. In some cases, the updated FDRA does not apply to the current grant (e.g., the DL grant of the DCI with the updated FDRA information) and is applied to PDSCH transmissions starting from some time in the future.

For instance, the network entity can configure the updated FDRA starting time to implement a configurable delay interval (e.g., a configurable time offset) between the DL grant in which an updated FDRA is received by the UE and the later time when the updated FDRA is applied and used to receive incoming PDCCH and/or PDSCH transmissions. For instance, the configurable delay before the updated FDRA application time corresponding to the UE implementing the updated PDSCH bandwidth can be based on a UE processing time. In some cases, the time offset between the DL grant where a UE receives updated FDRA information and the start time where the updated FDRA is applied by the UE can correspond to a delay interval that is greater than or equal to the UE processing time interval.

In some cases, the updated FDRA information can be indicated or determined based on a FDRA field in the DL grant DCI, as noted above. In some examples, the FDRA field can be included in only a portion of the plurality of different DCI formats that can be transmitted by the network entity and/or received by the UE. For instance, multiple DC formats for DL grants may be monitored by the UE. In one illustrative example, a long DCI format with updated FDRA information (e.g., with a FDRA field) may be sent relatively infrequently, such as when there is a need to switch the PDSCH bandwidth for the UE. A normal (e.g., short or shorter) format DCI can be used when there is not a need to change the PDSCH bandwidth for the UE, and DCI overhead may be reduced between the network entity and the UE.

In some examples, the UE can receive (e.g., and the network entity can transmit to the UE) configuration information indicative of a plurality of pre-determined, pre-defined, and/or pre-configured FDRA candidates for switching. Based on pre-configuring the limited set of FDRA switching candidates at the UE, the network entity can subsequently transmit (e.g., and the UE can receive) a DL grant DCI that includes a FDRA switching field. The FDRA switching field can be indicative of a selection from among the plurality of pre-defined FDRA switching candidates. The FDRA switching field can be smaller than the full FDRA field that may be used in examples where FDRA switching candidates are not pre-defined or pre-configured for the UE. In some aspects, configuring a plurality of FDRA switching candidates and utilizing a DL grant DCI with a FDRA switching field can reduce DCI overhead compared to utilizing a DL grant DCI with a full FDRA field. For example, a FDRA switching field can be indicated using a smaller or lesser number of bits than a full FDRA field.

In some examples, reliability of the FDRA update and PDSCH bandwidth updated for the UE can be improved based on determining the FDRA application time (e.g., FDRA starting time or time when the UE applies the updated FDRA to receive incoming PDCCH or PDSCH transmissions) as a configured amount of time after an ACK/NACK corresponding to the DL grant is received. For instance, the configured amount of time can be indicated from the network entity to the UE, and may be in units of slots or in absolute time.

FIG. 8 is a diagram 800 illustrating an example of an updated Frequency Domain Resource Allocation (FDRA) starting time based on an acknowledgement (ACK) and a time offset from the ACK, in accordance with some examples. For instance, a UE may receive a first DCI 812 that is a DL grant DCI indicative of an updated FDRA. In the DL grant corresponding to the first DCI 812, the UE can receive a scheduled PDSCH 815 without using (e.g., without applying) the updated FDRA indicated by the first DCI 812.

The FDRA starting time (e.g., FDRA application time) for the updated FDRA indicated by first DCI 812 can be determined based on an offset relative to the time when an ACK/NACK corresponding to the DL grant is received. For instance, the FDRA starting time for the updated FDRA indicated by first DCI 812 can be determined based on an offset 850 from an ACK 830 corresponding to the DL grant of first DCI 812. In some aspects, the offset 850 is determined starting from the time the network entity that transmitted DCI 812 and/or PDSCH 815 receives the ACK 830 (e.g., ACK 830 can be transmitted by the UE to the network entity). In some cases, the UE can receive ACK 830 from the network entity, and calculate the FDRA starting time for the updated FDRA indicated by first DCI 812 based on the time the UE receives ACK 830 from the network entity.

After the time offset 850 has passed (e.g., elapsed, expired, etc.), the updated FDRA indicated by first DCI 812 can be applied by the UE. For instance, the FDRA application time can correspond to the end of time offset 850 of FIG. 8. A second DCI 872 and a second PDSCH 875 can be received after the FDRA application time. For instance, the updated FDRA indicated by first DIC 812 can be applied to update the PDSCH bandwidth associated with the UE receiving second PDSCH 875, after the expiration of time offset 850 relative to ACK 830.

In another illustrative example, multiple FDRA choices (e.g., FDRA candidates or FDRA switching candidates) can be configured for the UE (e.g., configured based on configuration information received by the UE from a network entity). In some cases, when the FDRA for the UE changes (e.g., an updated FDRA and/or updated PDSCH bandwidth is implemented by the network entity for the UE), PDCCH decoding performed by the UE will fail or otherwise be incorrect if the UE is unaware of the updated FDRA and/or updated PDSCH bandwidth.

In some cases, when the network entity and the UE have different understandings of the current FDRA and/or the current PDSCH bandwidth for transmissions from the network entity to the UE, the DMRS will be incorrect (e.g., wrong location and wrong DMRS scrambling) and the PDCCH will be incorrect (e.g., PDCCH location is wrong). In some cases, assuming an OFDM waveform, multiple FDRA candidates can be pre-configured and/or pre-defined for a UE to reduce the probability of a mismatch between the UE and the network entity for the current FDRA and/or current PDSCH bandwidth being used.

In one illustrative example, the multiple FDRA candidates can each be associated with corresponding DMRS tone locations. To prevent the UE from using an incorrect DMRS (e.g., wrong DMRS location and/or wrong DMRS scrambling), the multiple FDRA candidates can be configured with DMRS tone locations that are at least partially overlapping with the corresponding DMRS tone locations of the remaining ones of the multiple FDRA candidates. For instance, at least a subset of DMRS tone locations can overlap (e.g., be common to and/or shared by) the respective sets of DMRS tone locations corresponding to each FDRA candidate of the multiple FDRA candidates. For example, DMRS tone locations for a smaller FDRA candidate (e.g., narrower bandwidth FDRA candidate) that is included within a larger FDRA candidate (e.g., within a wider bandwidth FDRA candidate) may be a subset of the DMRS tone locations of the larger FDRA candidate.

In some examples, the multiple FDRA candidates may not be nested with other ones of the multiple FDRA candidates, but may be at least partially overlapping. In some cases, the DMRS tone locations can be aligned for at least the overlapping portion(s) between any respective first and second FDRA candidates of the multiple FDRA candidates.

For DMRS scrambling, a fixed reference point can be used as a starting point. For instance, DMRS scrambling for each respective FDRA candidate may being from the same fixed reference starting point. The fixed reference starting point for DMRS scrambling can be FDRA-independent (e.g., DMRS scrambling can be performed without dependence on the particular FDRA candidate utilized or selected from the multiple FDRA candidates configured for the UE).

In some aspects, PDCCH rate matching can be performed based on configuring the multiple FDRA candidates (e.g., multiple FDRA assumptions) with one or more overlapping PDCCH locations. For instance, common PDCCH decoding candidates can be configured across (e.g., under) different FDRA assumptions of the multiple FDRA assumptions. In some aspects, the common PDCCH decoding candidates can be used to transmit (e.g., by the network entity) and receive (e.g., by the UE) DCIs even if the FDRA assumption used by the UE is incorrect (e.g., even if the particular FDRA candidate selected from the plurality of FDRA candidates by the UE is different form the FDRA used by the network entity for the transmission). In some examples, an overlapping portion of the multiple FDRA candidates (e.g., frequency resources included in the corresponding frequency resource allocation of each FDRA candidate) can be used as the starting point for PDCCH rate matching performed by the UE.

In some cases, the plurality of FDRA candidates can be configured based on identifying a common region of different FDRA candidates (e.g., common region of different FDRA assumptions) and configuring the respective DMRS for each FDRA candidate to be the same DMRS sequence over the common region under all FDRA hypotheses. In some examples, at least a portion of the PDCCH decoding candidates for the plurality of FDRA candidates can be configured within (e.g., located within) the common region under all FDRA hypotheses.

Figure 9:
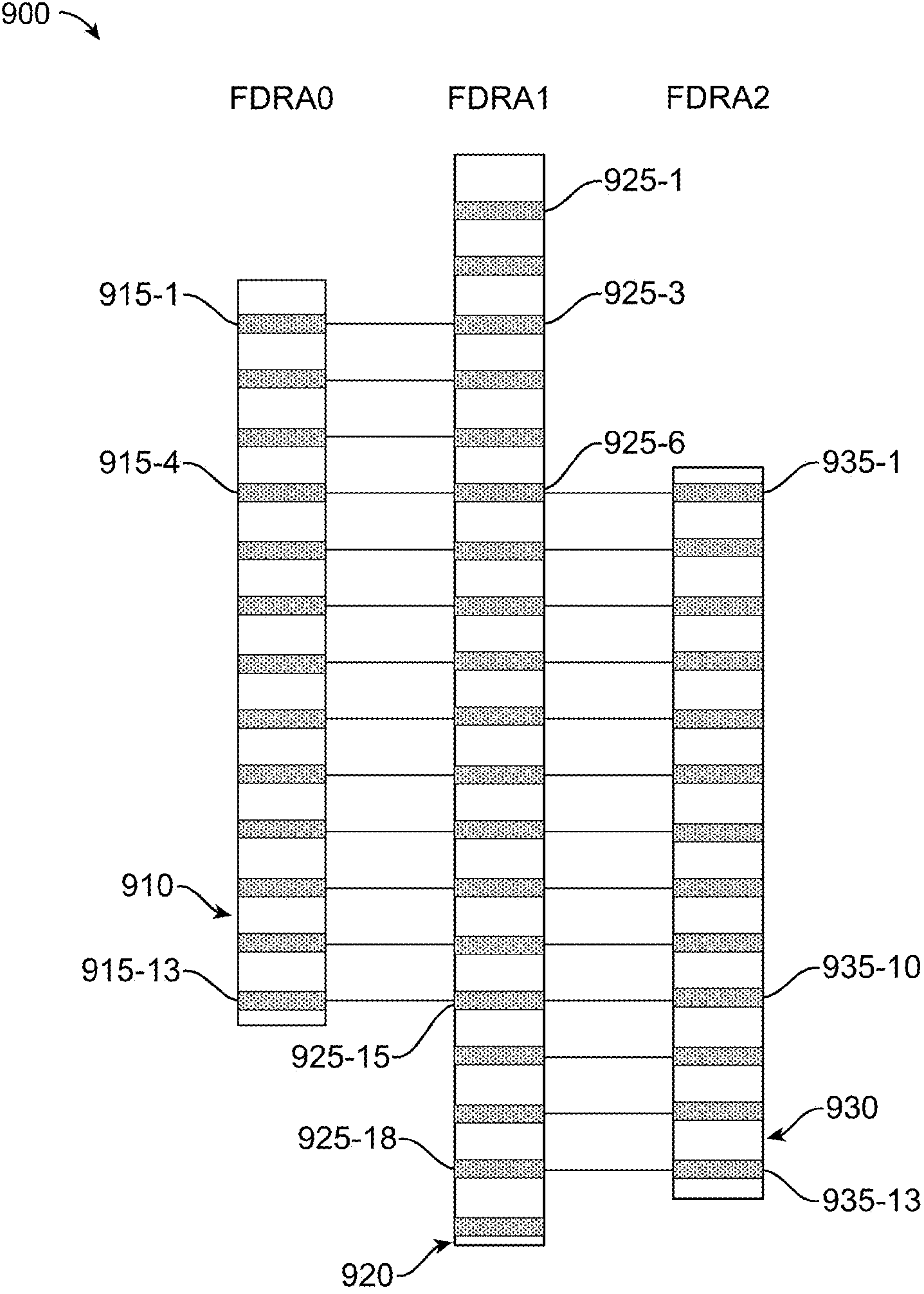
FIG. 9 is a diagram illustrating an example of various FDRA resolutions aligned with a Physical Resource Block Group (PRG) grid, in accordance with some examples.

FIG. 9 is a diagram illustrating an example 900 of various FDRA resolutions aligned with a Physical Resource Block Group (PRG) grid, in accordance with some examples. In one illustrative example, the systems and techniques may utilize Physical Resource Block Group (PRG)-based channel estimation. In examples where FDRA resolution is aligned with the PRG grid, the systems and techniques can utilize the per-PRG channel estimation. In some aspects, the systems and techniques can be used to configure a UE with one or more FDRA candidates where each FDRA candidate is aligned with the PRG grid.

In some aspects, aligning the FDRA with the PRG grid can be associated with the UE only needing to perform channel estimation for PRGs in the current FDRA (e.g., the currently applied FDRA by the UE). In some cases, if the UE's FDRA assumption is wrong, for PRGs in the underlying true FDRA (e.g., network entity's FDRA) but not in the UE's assumed FDRA, the channel estimation is not performed. For PRGs in the UE's incorrect FDRA assumption but not in the network entity's underlying true FDRA, the channel estimation will be wrong and is wasted.

For instance, FIG. 9 illustrates a first FDRA 910 ("FDRA0"), a second FDRA 920 ("FDRA1"), and a third FDRA 930 ("FDRA2"). Each FDRA 910-930 is PRG grid-aligned. By aligning each FDRA candidate (e.g., FDRAs 910-930) with the same PRG grid, the UE can reuse a portion of its channel estimation information that is determined for an incorrect FDRA assumption, where the reusable portion corresponds to the PRGs that are common to the UE's incorrect FDRA assumption and the network entity's true FDRA.

For example, if the UE's incorrect FDRA assumption is FDRA0 910 and the network entity's true FDRA is FDRA1 920, the UE may perform channel estimation for each of the PRGs 915 included within its incorrect FDRA assumption FDRA0 910. Based on aligning each of the FDRA candidates with the same PRG grid, if the UE's FDRA assumption is FDRA0 (910) and the network entity's true FDRA is FDRA1 (920), the channel estimation information for PRGs 915-1, . . . , 915-3 of FDRA0 can be reused for the corresponding and aligned PRGs 925-3, . . . , 925-15 of FDRA1.

If the UE's FDRA assumption is FDRA0 (910) and the network entity's true FDRA is FDRA2 (930), the channel estimation information for PRGs 915-4, . . . , 915-13 can be reused for the corresponding and aligned PRGs 935-1, . . . , 935-10 of FDRA2.

If the UE's FDRA assumption is FDRA1 (920) and the network entity's true FDRA is FDRA2 (930), the channel estimation information for PRGs 925-6, . . . , 925-18 can be reused for the corresponding and aligned PRGs 935-1, . . . , 935-13 of FDRA2.

In some aspects, if wideband channel estimation is used, the UE may implement multiple FDRA assumptions (e.g., multiple FDRA candidates of a plurality of configured FDRA candidates from the network entity) to perform channel estimation. The use of multiple FDRA assumptions for channel estimation may be associated with a higher complexity when multiple FDRA hypotheses on the FDRA are attempted, but the UE may perform multiple FDRA assumption channel estimation in only some circumstances. In another example, the UE can additionally, or alternatively, segment the FDRA into multiple segments along the FDRA boundary. Based on the segmentation, multiple smaller wideband channel estimations can be performed and/or utilized by the UE. The complexity of segmenting the FDRA into multiple segments along the FDRA boundary can be lower than performing channel estimation using multiple FDRA assumptions, and may be higher than the complexity of single FDRA channel estimation.

In some aspects, the UE can utilize a fixed reference point for DMRS scrambling for each FDRA candidate of the plurality of configured FDRA candidates from the network entity. For instance, instead of using the first RE of each respective FDRA 910, 920, 930, the UE can use the same RE that is aligned across and included in each respective FDRA 910, 920, 930 as a fixed reference point for DMRS scrambling. For instance, the UE can use the RE 935-1 of FDRA2 (930), the RE 925-6 of FDRA1 (920), and the RE 915-4 of FDRA0 (910) as the fixed reference point for DMRS scrambling.

Figures 10A, 10B:
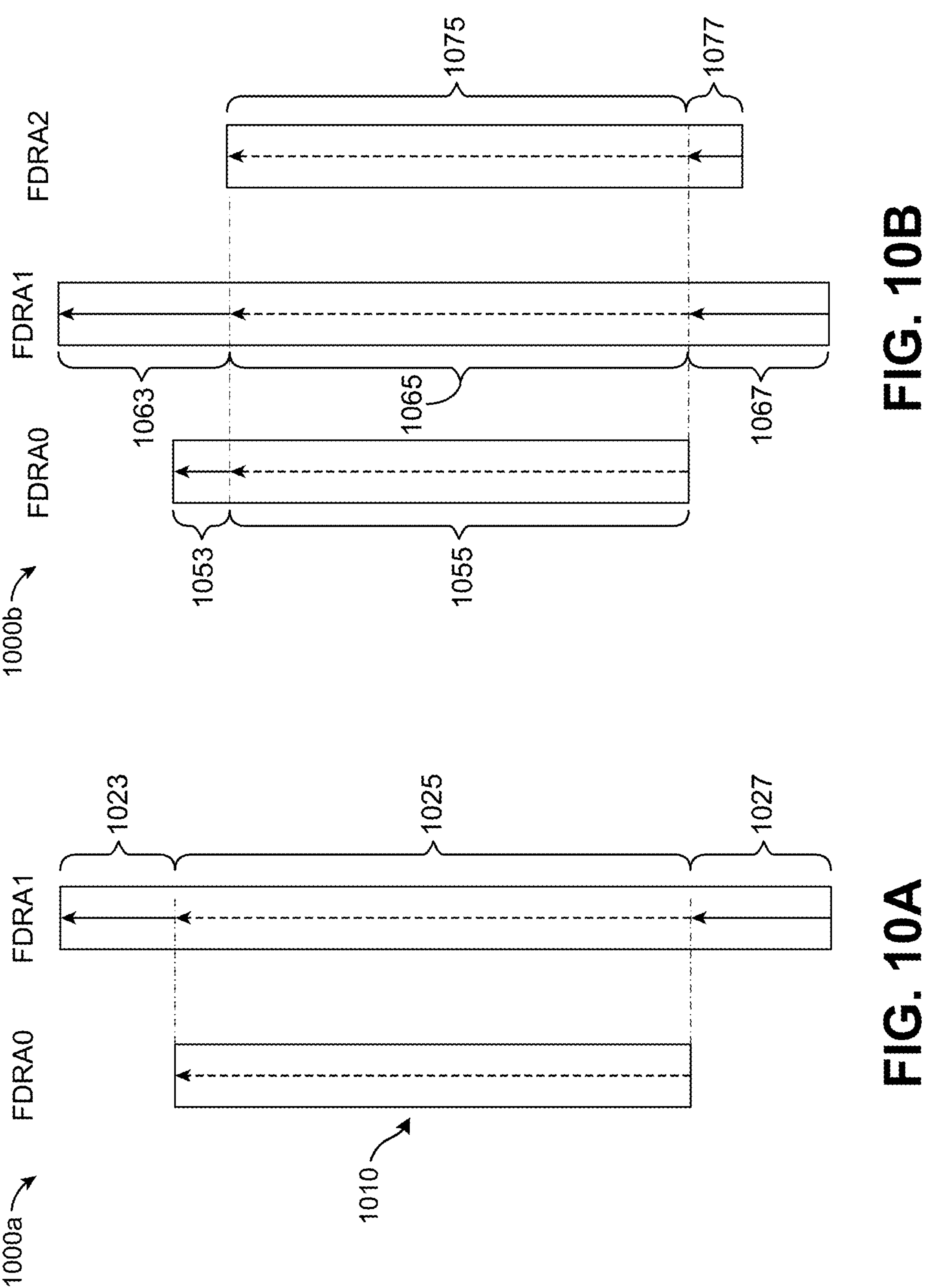
FIG. 10A is a diagram illustrating an example of a common PDCCH location between first and second FDRAs, in accordance with some examples.
FIG. 10B is a diagram illustrating an example of a common PDCCH location between first, second, and third FDRAs, in accordance with some examples.

FIG. 10A is a diagram illustrating an example 1000*a* of a common PDCCH location between a first FDRA0 and a second FDRA1, in accordance with some examples. FIG. 10B is a diagram illustrating an example 1000*b* of a common PDCCH location between first, second, and third FDRAs (e.g., FDRA0, FDRA1, FDRA2, respectively), in accordance with some examples. The common PDCCH location can also be referred to as a common PDCCH region, and corresponding channel estimation for the common PDCCH region across FDRA candidates can be reused in cases where the UE's FDRA assumption is incorrect. For instance, in FIG. 10A, the common PDCCH region is the same as the first FDRA candidate 1010 (e.g., FDRA0). The first FDRA 1010 corresponds to the region 1025 of FDRA1, and if FDRA1 is incorrectly used as the FDRA assumption by the UE, only the upper and lower PDCCH regions 1023 and 1027 are wasted and discarded, and the overlapping PDCCH region 1025 can be reused based on its overlap with the FDRA0 1010.

In another example, the common PDCCH region across the three FDRAs of FIG. 10B corresponds to the PDCCH region 1055 of FDRA0 (e.g., with PDCCH region 1053 wasted or discarded if FDRA0 is used as an incorrect UE FDRA assumption), the PDCCH region 1065 of FDRA1 (e.g., with PDCCH regions 1063 and 1067 wasted or discarded if FDRA1 is used as an incorrect UE FDRA assumption), and the PDCCH region 1075 of FDRA2 (e.g., with PDCCH region 1077 wasted or discarded if FDRA2 is used as an incorrect UE FDRA assumption).

Figure 11:
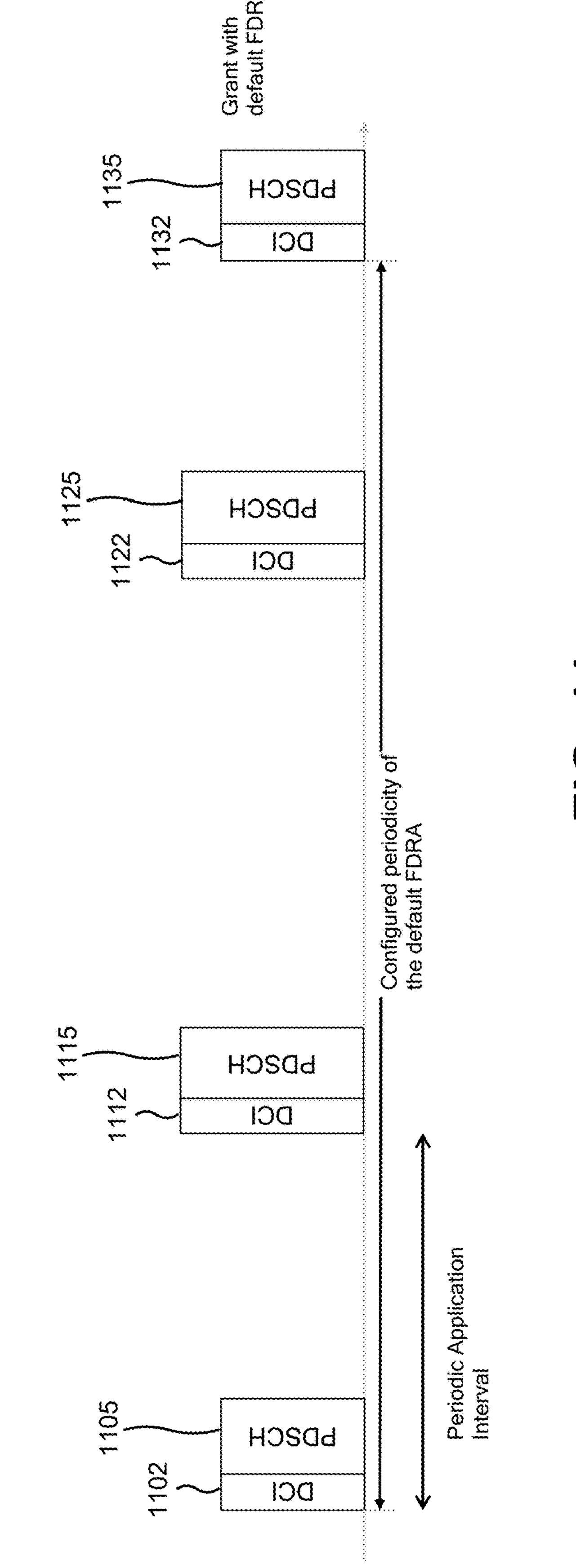
FIG. 11 is a diagram illustrating a default FDRA applied with a configured periodicity between PDCCH monitoring occasions, in accordance with some examples.

FIG. 11 is a diagram 1100 illustrating a default FDRA applied with a configured periodicity between PDCCH monitoring occasions, in accordance with some examples. In some aspects, the systems and techniques can configure the UE with a default FDRA that is applied at some PDCCH monitoring occasions with a configured default FDRA periodicity. For instance, a default FDRA can be configured for the UE and utilized to receive a first DCI 1102 and corresponding first PDSCH 1105 at the default PDSCH bandwidth of the default FDRA. The default FDRA can be configured with a periodic pattern in which the default FDRA is used as the current FDRA for the UE, independent of what the UE's current or active FDRA might otherwise be for the periodic default FDRA interval.

For instance, the default FDRA can be applicable for the "periodic application interval" shown in FIG. 11, where each periodic application interval is separated in time by the "configured periodicity of the default FDRA" shown in FIG. 11. Within each periodic application interval of the default FDRA, the UE can receive a DCI, PDSCH, etc. from the network entity using the default FDRA and the default PDSCH bandwidth corresponding to the default FDRA.

For instance, the DCI 1102 and PDSCH 1105 are received in a first periodic application interval of the default FDRA and the DCI 1132 and PDSCH 1135 are received in a second periodic application interval of the default FDRA (e.g., DCI 1102 and DCI 1132 can be separated by the configured periodicity of the default FDRA). DCIs 1102, 1132 and PDSCHs 1105, 1135 may each be received using the default FDRA and corresponding default PDSCH bandwidth, which is applied (e.g., used) by the UE for receiving incoming PDCCH and PDSCH transmissions during each one of the first and second periodic application intervals of the default FDRA.

Between the first and second periodic application intervals of the default FDRA, the UE can receive any incoming PDCCH and/or PDSCH transmissions using the FDRA assumption determined by the UE as the currently active FDRA assumption or FDRA candidate. For instance, DCIs 1112, 1122 are received outside of the periodic application interval of the default FDRA, and can be received using a FDRA and corresponding PDSCH bandwidth that is different from the default FDRA and corresponding default PDSCH bandwidth. Similarly, PDSCHs 1115, 1125 are received outside of the periodic application interval of the default FDRA, and can be received using a FDRA and corresponding PDSCH bandwidth that is different from the default FDRA and corresponding default PDSCH bandwidth. In some cases, the UE can utilize multiple different FDRA candidates or assumption (e.g., multiple different corresponding PDSCH bandwidths) in the time between periodic application intervals of the default FDRA. For instance, the DCI 1112 and PDSCH 1115 may be received using a FDRA assumption and PDSCH bandwidth hat is different from the respective FDRA assumption and PDSCH bandwidth used to receive the DCI 1122 and PDSCH 1125.

Figure 12:
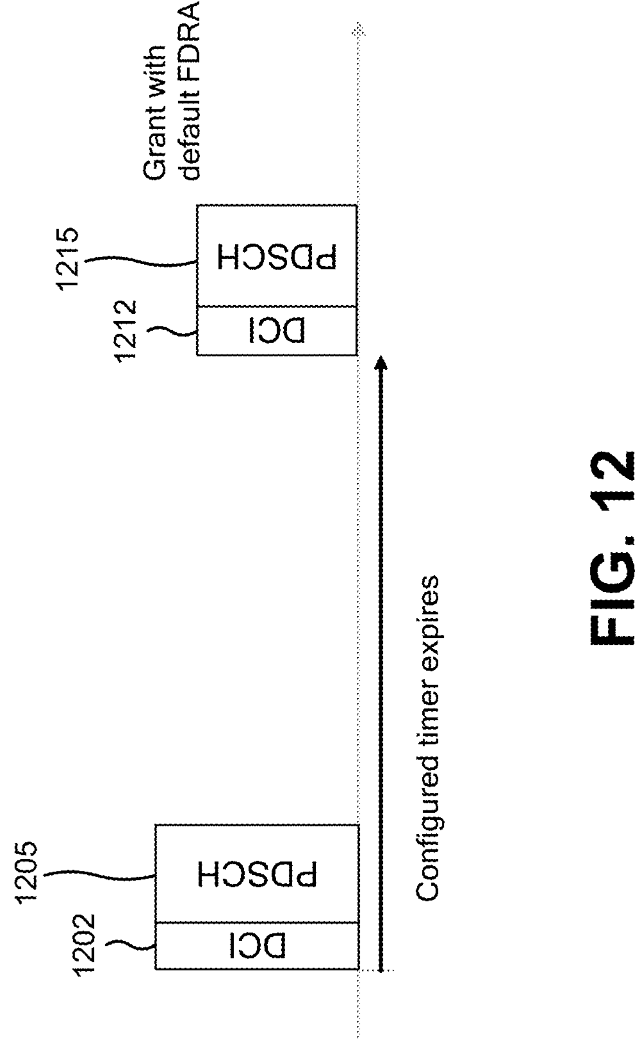
FIG. 12 is a diagram illustrating an example of timer-based fallback to a default FDRA, in accordance with some examples.

FIG. 12 is a diagram illustrating an example of timer-based fallback 1200 to a default FDRA, in accordance with some examples. In one illustrative example, the UE can be configured (e.g., based on configuration information received from a network entity) with a default FDRA or default FDRA information (e.g., the same as or similar to the default FDRA described above). The UE can additionally be configured with a corresponding timer value for applying the default FDRA. For instance, the UE can implement a timer that counts down from the configured timer value. Based on the timer expiring at the UE, the UE can apply the default FDRA configured by the network entity. For instance, the UE can be configured with a default FDRA and a corresponding default FDRA timer value of 10 seconds. The UE can receive a first DCI 1202 associated with PDSCH 1205 at a first time, and can start the timer when first DCI 1202 is received (e.g., first DCI 1202 is received using a current FDRA candidate or assumption that is different from the configured default FDRA). If the UE does not receive any valid control transmissions (e.g., PDCCH, DCI, etc.) from the network entity before the default FDRA timer expires, the UE will fall back to the default FDRA. For instance, if a valid control transmission is not received for at least 10 seconds after DCI 1202 is received using the UE's current FDRA assumption, the UE will switch to applying the default FDRA until a next control transmission is successfully received using the default FDRA. In the example of FIG. 12, the configured default FDRA timer expires before DCI 1212 and PDSCH 1215 are received by the UE. The UE can receive DCI 1212 and PDSCH 1215 using the configured default FDRA, which is shown in the example of FIG. 12 as corresponding to a narrower PDSCH bandwidth than the wider PDSCH bandwidth corresponding to the UE's FDRA assumption that is earlier used to receive DCI 1212 and PDSCH 1205. If DCI 1212 and/or PDSCH 1215 are detected by the UE as a valid control using the current active FDRA, the default FDRA timer can be reset. In some aspects, the use of the default FDRA and default FDRA timer can allow the UE and network entity to establish a connection using the default FDRA in cases where an error occurs and the network entity and UE lose sync on the active FDRA. In some aspects, the default FDRA and/or default FDRA timer information can be configured based on an RRC message transmitted by the network entity and received by the UE.

In some examples, the network entity can transmit (and the UE can receive) an empty DL grant that is indicative of a changed or updated FDRA or FDRA information. For instance, an empty DL grant can be implemented as a DCI message without scheduling a PDSCH. In some examples, the empty DL grant DCI message includes a FDRA field or FDRA information indicative of the updated FDRA, and does not include additional information associated with scheduling a PDSCH transmission. For example, the empty DL grant DCI message does not include a data allocation. In some examples, the empty DL grant DCI message is not itself entirely empty, but can include the FDRA field and/or other fields and/or information indicative of an updated FDRA or updated FDRA information. The empty DL grant DCI message can additionally include one or more indications that no data or PDSCH transmission is scheduled by the empty DL grant DCI. In some aspects, the empty DL grant DCI message can reuse one or more DIC fields that would otherwise be used to scheduled data or PDSCH transmission to indicate the FDRA change upcoming for the UE (e.g., to indicate an updated FDRA for a corresponding updated PDSCH bandwidth scheduled to be applied by the UE in the future).

FIG. 13 is a flowchart diagram illustrating an example of a process 1300 for wireless communication. The process 1300 may be performed by a network entity or network device (or apparatus) or a component (e.g., a chipset, codec, etc.) of the network entity or device. The network entity may be a UE (e.g., the UE 104 of FIG. 1, FIG. 2, and/or FIG. 3, the wireless device 407 of FIG. 4, or other UE). The network entity (e.g., UE) can be a mobile device (e.g., a mobile phone), a network-connected wearable such as a watch, an extended reality (XR) device (e.g., a virtual reality (VR) device or augmented reality (AR) device), a vehicle or component or system of a vehicle, or other type of computing device configured to perform wireless communications. The operations of the process 1300 may be implemented as software components that are executed and run on one or more processors (e.g., the transmit processor 264, the receive processor 258, the TX MIMO processor 266, the MIMO detector 256 of FIG. 2, the processor(s) 484 of FIG. 4, the processor 1510 of FIG. 15, or other processor(s)). Further, the transmission and reception of signals by the network entity in the process 1000 may be enabled, for example, by one or more antennas, one or more transceivers (e.g., wireless transceiver(s)), and/or other communication components (e.g., the transmit processor 264, the receive processor 258, the TX MIMO processor 266, the MIMO detector 256, the modulator(s)/demodulator(s) 254*a* through 254*t*, and/or the antenna(es) 252*a* through 252*t* of FIG. 2, the antenna(es) 487 of FIG. 4, the wireless transceiver(s) 478 of FIG. 4, the communication interface 1540 of FIG. 15, or other antennae(s), transceiver(s), and/or component(s)).

At block 1302, the network entity (or component thereof) can determine an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS).

For instance, the scheduled PDSCH transmission can be the same as or similar to one or more of PDSCH 706 of FIG. 7A; PDSCH 756 of FIG. 7B; PDSCH 815 of FIG. 8; PDSCH

875 of FIG. 8; PDSCH 1105, 1115, 1125, and/or 1135 of FIG. 11; PDSCH 1205 and/or 1215 of FIG. 12; etc. In some examples, the PDCCH transmission can be the same as or similar to one or more of PDCCH 702 of FIG. 7A, PDCCH 752 of FIG. 7B, etc. In some cases, the shared configured DMRS can be the same as or similar to one or more of DMRS 705 of FIG. 7A, DMRS 755 of FIG. 7B, etc.

For instance, the network entity (e.g., UE) can determine the updated bandwidth based on downlink (DL) bandwidth part (BWP) switching information. In some cases, the DL BWP switching information can be received from a second network entity (e.g., base station, gNB, etc.). In some cases, the DL BWP switching information can be indicative of a particular BWP bandwidth included in a plurality of BWP switching candidates. For example, the plurality of BWP bandwidth switching candidates can be configured based on a Radio Resource Control (RRC) message indicative of the plurality of BWP bandwidth switching candidates.

In some aspects, the scheduled PDSCH transmission is scheduled based on a Downlink Control Information (DCI) included in the PDCCH transmission. The PDCCH transmission and DCI can be received from the second network entity (e.g., base station, gNB, etc.). In some examples, the DCI does not include a Frequency Domain Resource Allocation (FDRA) field for the scheduled PDSCH transmission. In some cases, the DCI can be the same as or similar to one or more of DCI 812 or DCI 872 of FIG. 8; DCI 1102, 1112, 1122, 1132 of FIG. 11; DCI 1202, 1212 of FIG. 12; etc.

In some cases, the network entity is configured to receive RRC reconfiguration information corresponding to a DL BWP, wherein the updated bandwidth is determined based on the RRC reconfiguration information. For instance, the DL BWP can be associated with the PDSCH transmission, the PDCCH transmission, and the shared configured DMRS.

In some examples, the network entity can determine the updated bandwidth based on receiving RRC configuration information indicative of a PDSCH bandwidth. For example, the network entity can determine the updated bandwidth based on the RRC configuration information. In some cases, the updated bandwidth is within a DL BWP.

In some examples, the network entity can be configured to receive configuration information indicative of a plurality of candidate PDSCH bandwidths. For instance, the configuration information can be received from a base station, gNB, etc. In some examples, the network entity can receive, via a Media Access Control-Control Element (MAC-CE) or downlink control information (DCI), information indicative of a particular candidate PDSCH bandwidth of the plurality of candidate PDSCH bandwidths. In some cases, the network entity is configured to determine the updated bandwidth based on the information indicative of the particular candidate PDSCH bandwidth.

In some cases, the network entity can be configured to receive a first downlink control information (DCI) indicative of Frequency Domain Resource Allocation (FDRA) information, wherein the first DCI corresponds to a first downlink (DL) grant that is earlier than a second DL grant corresponding to the scheduled PDSCH transmission, wherein, to determine the updated bandwidth, the network entity is configured to determine the updated bandwidth based on the FDRA information. In some cases, the FDRA information can be the same as or similar to one or more of the FRDA0 910, FDRA1 920, and/or FDRA2 930 of FIG. 9; one or more of the FDRA0 and/or FDRA1 of FIG. 10A; and/or one or more of the FDRA0, FDRA1, and/or FDRA2 of FIG. 10B.

In some examples, the network entity is configured to apply the FDRA information after a configured delay corresponding to a processing time of the network entity. For example, the configured delay can be the same as or similar to the time offset 850 of FIG. 8. In some examples, the network entity can receive a second DCI indicative of a second PDSCH transmission scheduled after the scheduled PDSCH transmission, wherein the second PDSCH transmission reuses the updated bandwidth, and wherein the second DCI does not include a FDRA field.

In some examples, the network entity can transmit an acknowledgement (ACK) corresponding to one or more of the FDRA information or the first DCI. For instance, the ACK can be the same as or similar to the ACK 830 of FIG. 8 and the first DCI can be the same as or similar to the DCI 812 of FIG. 8. The second DCI can be the same as or similar to DCI 872 of FIG. 8 and the second PDSCH transmission can be the same as or similar to the PDSCH 875. The scheduled PDSCH transmission can be the same as or similar to the PDSCH 815 of FIG. 8.

In some cases, the network entity can determine a FDRA starting time based on a time offset from the ACK. For example, the time offset from the ACK can be the same as or similar to the time offset 850 from ACK 830 of FIG. 8. The network entity can apply the FDRA information after the FDRA starting time. In some cases, the time offset from the ACK comprises a configured number of time slots or a configured time value. In some examples, the network entity is configured to receive the scheduled PDSCH transmission using the updated bandwidth after the FDRA starting time.

In some examples, the FDRA information is indicative of a set of allocated resource blocks (RBs) for the network entity, and wherein the updated bandwidth corresponds to a bandwidth of the set of allocated RBs. In some cases, the FDRA information comprises an index value indicative of an allocation of a particular FDRA of a configured plurality of FDRAs for the network entity. In some cases, the configured plurality of FDRAs is associated with a subset of shared resource elements (REs). In some examples, each FDRA of the configured plurality of FDRAs includes the subset of shared REs and is associated with a corresponding DMRS sequence for the subset of shared REs. In some examples, each FDRA of the configured plurality of FDRAs is associated with a fixed reference point for DMRS scrambling. In some examples, the network entity is configured to perform PDCCH rate matching based on a starting point corresponding to the subset of shared REs associated with configured plurality of FDRAs.

In some cases, the network entity can be configured to determine a timer associated with a configured default Frequency Domain Resource Allocation (FDRA) for the network entity has expired. For instance, the timer can be the same as or similar to the configured timer of FIG. 12 shown between DCI 1202 and DCI 1212. In some cases, the network entity can determine an updated bandwidth based on a bandwidth of the configured default FDRA. For instance, the updated bandwidth can be the same as or similar to an updated bandwidth associated with one or more of DCI 1212 and/or PDSCH 1215 of FIG. 12. In some examples, the configured default FDRA can be the same as or similar to a FDRA associated with one or more of DCI 1212 and/or PDSCH 1215 of FIG. 12. In some examples, the network entity can determine a configured periodicity associated with the configured default FDRA and apply the configured default FDRA based on the configured periodicity.

At block 1304, the network entity (or component thereof) can receive, based on the shared configured DMRS, the scheduled PDSCH transmission using the updated bandwidth.

Figure 14:
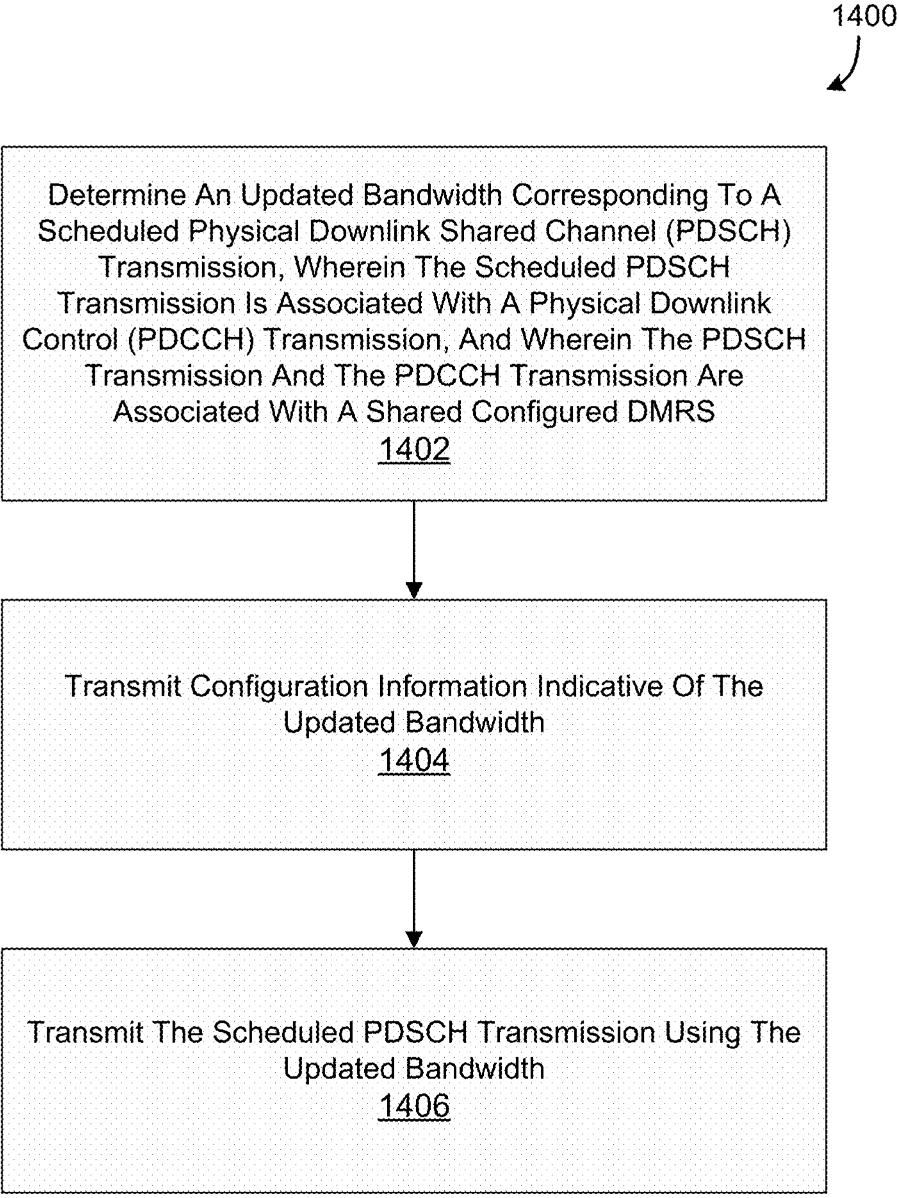
FIG. 14 is a flow diagram illustrating another example of a process for wireless communication, in accordance with some examples.

FIG. 14 is a flowchart diagram illustrating an example of a process 1400 for wireless communication. The process 1400 may be performed by a network entity or network device (or apparatus) or a component (e.g., a chipset, codec, etc.) of the network entity or device. The network entity may be a base station (e.g., an eNB, a gNB, etc.) or a portion of a base station (e.g., one or more of a CU, a DU, a RU, a Near-RT RIC, and/or a Non-RT RIC, such as the CU 310, the DU 330, the RU 340, the Near-RT RIC 325, and/or the Non-RT RIC 315 of the disaggregated base station 300 of FIG. 3), server device, or other network entity. The operations of the process 1100 may be implemented as software components that are executed and run on one or more processors (e.g., the transmit processor 220, the receive processor 238, the TX MIMO processor 230, the MIMO detector 236 of FIG. 2 and/or the processor 1510 of FIG. 15, or other processor(s)). Further, the transmission and reception of signals by the network entity in the process 1400 may be enabled, for example, by one or more antennas, one or more transceivers (e.g., wireless transceiver(s)), and/or other communication components (e.g., the transmit processor 220, the receive processor 238, the TX MIMO processor 230, the MIMO detector 236, the modulator(s)/demodulator (s) 232*a* through 232*t*, and/or the antenna(es) 234*a* through 234*t* of FIG. 2, the communication interface 1540 of FIG. 15, or other antennae(s), transceiver(s), and/or component (s)).

At block 1402, the network device (or component thereof) can determine an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS).

For instance, the scheduled PDSCH transmission can be the same as or similar to one or more of PDSCH 706 of FIG. 7A; PDSCH 756 of FIG. 7B; PDSCH 815 of FIG. 8; PDSCH 875 of FIG. 8; PDSCH 1105, 1115, 1125, and/or 1135 of FIG. 11; PDSCH 1205 and/or 1215 of FIG. 12; etc. In some examples, the PDCCH transmission can be the same as or similar to one or more of PDCCH 702 of FIG. 7A, PDCCH 752 of FIG. 7B, etc. In some cases, the shared configured DMRS can be the same as or similar to one or more of DMRS 705 of FIG. 7A, DMRS 755 of FIG. 7B, etc.

In some aspects, the scheduled PDSCH transmission is scheduled based on a Downlink Control Information (DCI) included in the PDCCH transmission. The PDCCH transmission and DCI can be received from the second network entity (e.g., base station, gNB, etc.). In some examples, the DCI does not include a Frequency Domain Resource Allocation (FDRA) field for the scheduled PDSCH transmission. In some cases, the DCI can be the same as or similar to one or more of DCI 812 or DCI 872 of FIG. 8; DCI 1102, 1112, 1122, 1132 of FIG. 11; DCI 1202, 1212 of FIG. 12; etc.

In some cases, the network device (or component thereof) can be configured to transmit the PDCCH transmission. The PDCCH transmission can include a DCI indicative of scheduling information of the scheduled PDSCH transmission. In some cases, the DCI does not include a FDRA field for the scheduled PDSCH transmission. In some examples, the network device (or component thereof) can be configured to modulate the scheduled PDSCH transmission based on the shared configured DMRS. In some examples, the network deice is a base station or gNB and the scheduled PDSCH transmission cab be transmitted from the network device to a user equipment (UE) or other network entity associated with the network device.

At block 1404, the network device (or component thereof) can transmit configuration information indicative of the updated bandwidth. For instance, the network deice (or component thereof) can transmit a Radio Resource Control (RRC) message indicative of a plurality of downlink (DL) bandwidth part (BWP) switching candidates. In some examples, the network device (or component thereof) can transmit information indicative of a particular DL BWP switching candidate of the plurality of DL BWP switching candidates.

At block 1406, the network device (or component thereof) can transmit the scheduled PDSCH using the updated bandwidth.

In some cases, the computing device or apparatus configured to perform the process 1300 and/or the process 1400 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1300 and the process 1400 are illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1300, the process 1400, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
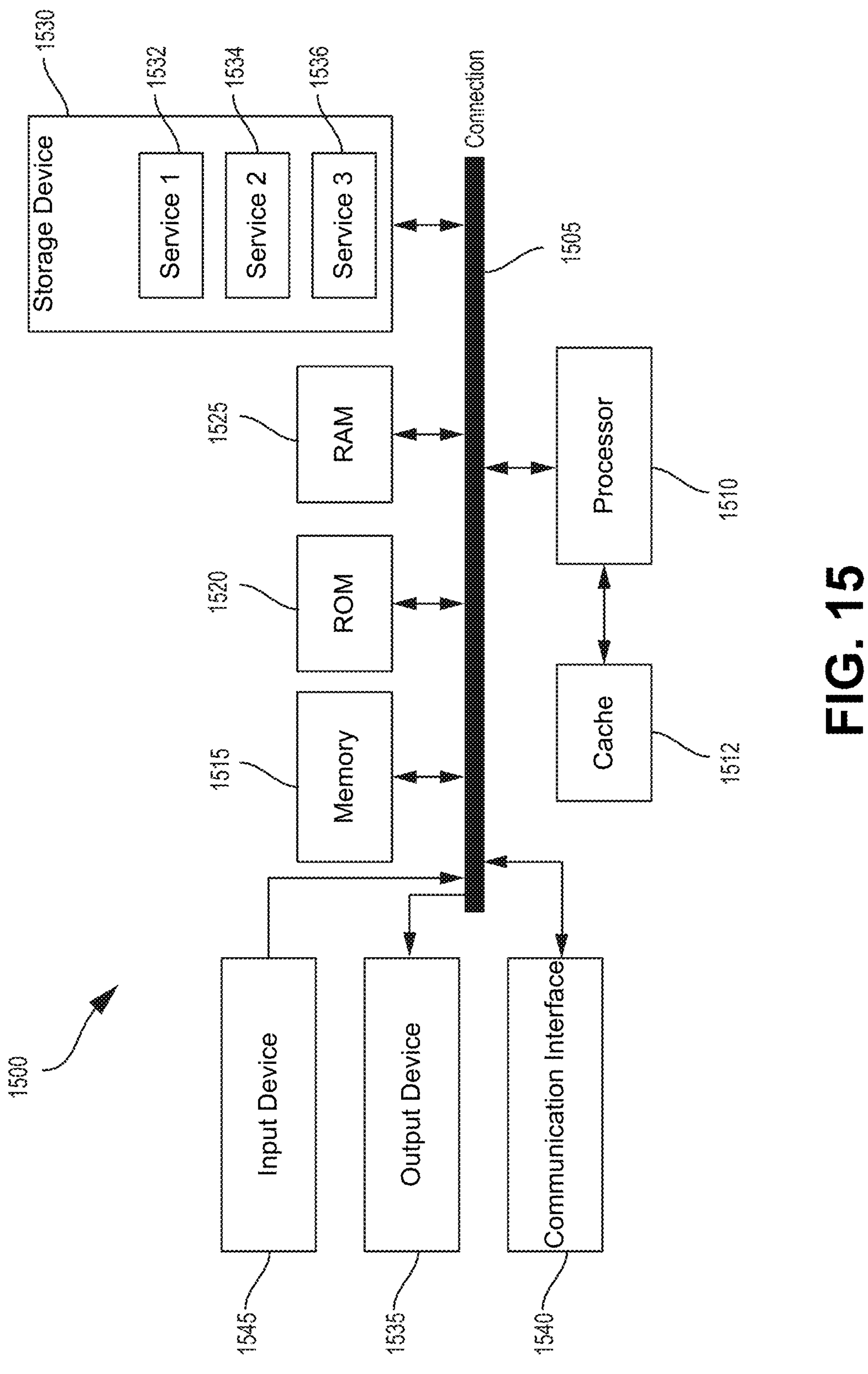
FIG. 15 is a block diagram illustrating an example of a computing system, in accordance with some examples.

FIG. 15 is a diagram illustrating an example of a system for implementing certain aspects of the present technology. In particular, FIG. 15 illustrates an example of computing system 1500, which may be for example any computing device making up internal computing system, a remote computing system, a camera, or any component thereof in which the components of the system are in communication with each other using connection 1505. Connection 1505 may be a physical connection using a bus, or a direct connection into processor 1510, such as in a chipset architecture. Connection 1505 may also be a virtual connection, networked connection, or logical connection.

In some aspects, computing system 1500 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1500 includes at least one processing unit (CPU or processor) 1510 and connection 1505 that communicatively couples various system components including system memory 1515, such as read-only memory (ROM) 1520 and random access memory (RAM) 1525 to processor 1510. Computing system 1500 may include a cache 1514 of high-speed memory connected directly with, in close proximity to, or integrated as part of processor 1510.

Processor 1510 may include any general-purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which may represent any number of input mechanisms, such as a microphone for speech, a touch-sensitive screen for gesture or graphical input, keyboard, mouse, motion input, speech, etc. Computing system 1500 may also include output device 1535, which may be one or more of a number of output mechanisms. In some instances, multimodal systems may enable a user to provide multiple types of input/output to communicate with computing system 1500.

Computing system 1500 may include communications interface 1540, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1530 may include software services, servers, services, etc., that when the code that defines such software is executed by the processor 1510, it causes the system to perform a function. In some aspects, a hardware service that performs a particular function may include the software component stored in a computer-readable medium in connection with the necessary hardware components, such as processor 1510, connection 1505, output device

1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Claim language or other language reciting "at least one processor configured to," "at least one processor being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A network entity for wireless communication, comprising: at least one memory; and at least one processor coupled to the at least one memory, wherein the network entity is configured to: determine an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); and receive, based on the shared configured DMRS, the scheduled PDSCH transmission using the updated bandwidth.

Aspect 2. The network entity of Aspect 1, wherein, to determine the updated bandwidth, the network entity is configured to determine the updated bandwidth based on downlink (DL) bandwidth part (BWP) switching information.

Aspect 3. The network entity of Aspect 2, wherein: the scheduled PDSCH transmission is scheduled based on a Downlink Control Information (DCI) included in the PDCCH transmission; and the DCI does not include a Frequency Domain Resource Allocation (FDRA) field for the scheduled PDSCH transmission.

Aspect 4. The network entity of any of Aspects 2 to 3, wherein the DL BWP switching information is indicative of a particular BWP bandwidth included in a plurality of BWP bandwidth switching candidates.

Aspect 5. The network entity of Aspect 4, wherein the plurality of BWP bandwidth switching candidates are configured based on a Radio Resource Control (RRC) message indicative of the plurality of BWP bandwidth switching candidates.

Aspect 6. The network entity of any of Aspects 1 to 5, wherein the network entity is configured to: receive Radio Resource Control (RRC) reconfiguration information corresponding to a downlink (DL) bandwidth part (BWP), wherein, to determine the updated bandwidth, the network entity is configured to determine the updated bandwidth based on the RRC reconfiguration information.

Aspect 7. The network entity of Aspect 6, wherein the DL BWP is associated with the PDSCH transmission, the PDCCH transmission, and the shared configured DMRS.

Aspect 8. The network entity of any of Aspects 1 to 7, wherein the network entity is configured to: receive Radio Resource Control (RRC) configuration information indicative of a PDSCH bandwidth, wherein to determine the updated bandwidth, the network entity is configured to determine the updated bandwidth based on the RRC configuration information.

Aspect 9. The network entity of Aspect 8, wherein the updated bandwidth is within a downlink (DL) bandwidth part (BWP).

Aspect 10. The network entity of any of Aspects 1 to 9, wherein the network entity is configured to: receive configuration information indicative of a plurality of candidate PDSCH bandwidths; and receive, via a Media Access Control-Control Element (MAC-CE) or downlink control information (DCI), information indicative of a particular candidate PDSCH bandwidth of the plurality of candidate PDSCH bandwidths, wherein, to determine the updated bandwidth, the network entity is configured to determine the updated bandwidth based on the information indicative of the particular candidate PDSCH bandwidth.

Aspect 11. The network entity of any of Aspects 1 to 10, wherein the network entity is configured to: receive a first downlink control information (DCI) indicative of Frequency Domain Resource Allocation (FDRA) information, wherein the first DCI corresponds to a first downlink (DL) grant that is earlier than a second DL grant corresponding to the scheduled PDSCH transmission, wherein, to determine the updated bandwidth, the network entity is configured to determine the updated bandwidth based on the FDRA information.

Aspect 12. The network entity of Aspect 11, wherein the network entity is configured to apply the FDRA information after a configured delay corresponding to a processing time of the network entity.

Aspect 13. The network entity of any of Aspects 11 to 12, wherein the network entity is configured to: receive a second DCI indicative of a second PDSCH transmission scheduled after the scheduled PDSCH transmission, wherein the second PDSCH transmission reuses the updated bandwidth, and wherein the second DCI does not include a FDRA field.

Aspect 14. The network entity of any of Aspects 11 to 13, wherein the network entity is configured to: transmit an acknowledgement (ACK) corresponding to one or more of the FDRA information or the first DCI; determine a FDRA starting time based on a time offset from the ACK; and apply the FDRA information after the FDRA starting time.

Aspect 15. The network entity of Aspect 14, wherein the time offset from the ACK comprises a configured number of time slots or a configured time value.

Aspect 16. The network entity of any of Aspects 14 to 15, wherein, to receive the scheduled PDSCH transmission using the updated bandwidth, the network entity is configured to receive the scheduled PDSCH transmission using the updated bandwidth after the FDRA starting time.

Aspect 17. The network entity of any of Aspects 11 to 16, wherein the FDRA information is indicative of a set of allocated resource blocks (RBs) for the network entity, and wherein the updated bandwidth corresponds to a bandwidth of the set of allocated RBs.

Aspect 18. The network entity of any of Aspects 11 to 17, wherein the FDRA information comprises an index value indicative of an allocation of a particular FDRA of a configured plurality of FDRAs for the network entity Aspect 19. The network entity of Aspect 18, wherein: the configured plurality of FDRAs is associated with a subset of shared resource elements (REs); and each FDRA of the configured plurality of FDRAs includes the subset of shared REs and is associated with a corresponding DMRS sequence for the subset of shared REs.

Aspect 20. The network entity of any of Aspects 18 to 19, wherein each FDRA of the configured plurality of FDRAs is associated with a fixed reference point for DMRS scrambling.

Aspect 21. The network entity of any of Aspects 18 to 20, wherein the network entity is configured to: perform PDCCH rate matching based on a starting point corresponding to the subset of shared REs associated with configured plurality of FDRAs.

Aspect 22. The network entity of any of Aspects 1 to 21, wherein the network entity is configured to: determine a timer associated with a configured default Frequency Domain Resource Allocation (FDRA) for the network entity has expired; and determine an updated bandwidth based on a bandwidth of the configured default FDRA.

Aspect 23. The network entity of Aspect 22, wherein the network entity is configured to: determine a configured periodicity associated with the configured default FDRA; and apply the configured default FDRA based on the configured periodicity.

Aspect 24. The network entity of any of Aspects 1 to 23, wherein the network entity is a user equipment (UE).

Aspect 25. A method for wireless communication by a network entity, comprising: determining an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); and receiving, based on the shared configured DMRS, the scheduled PDSCH transmission using the updated bandwidth.

Aspect 26. A network entity for wireless communication, comprising: at least one memory; and at least one processor coupled to the at least one memory, wherein the network entity is configured to: determine an updated bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); transmit configuration information indicative of the updated bandwidth; and transmit the scheduled PDSCH transmission using the updated bandwidth.

Aspect 27. The network entity of Aspect 26, wherein the network entity is configured to: transmit the PDCCH transmission, wherein the PDCCH includes a Downlink Control Information (DCI) indicative of scheduling information of the scheduled PDSCH transmission, and wherein the DCI does not include a Frequency Domain Resource Allocation (FDRA) field for the scheduled PDSCH transmission.

Aspect 28. The network entity of any of Aspects 26 to 27, wherein, to transmit configuration information indicative of the updated bandwidth, the network entity is configured to: transmit a Radio Resource Control (RRC) message indicative of a plurality of downlink (DL) bandwidth part (BWP) switching candidates; and transmit information indicative of a particular DL BWP switching candidate of the plurality of DL BWP switching candidates.

Aspect 29. The network entity of any of Aspects 26 to 28, wherein the network entity is configured to modulate the scheduled PDSCH transmission based on the shared configured DMRS.

Aspect 30. The network entity of any of Aspects 26 to 29, wherein the network entity is a base station or gNB.

Aspect 31. A method for wireless communications comprising performing operations according to any of Aspects 1 to 24.

Aspect 32. A method for wireless communications comprising performing operations according to Aspect 25.

Aspect 33. A method for wireless communications comprising performing operations according to any of Aspects 26 to 30.

Aspect 34. A non-transitory computer-readable storage medium comprising instructions stored thereon which, when executed by at least one processor, causes the at least one processor to perform operations according to any of Aspects 1 to 24.

Aspect 35. A non-transitory computer-readable storage medium comprising instructions stored thereon which, when executed by at least one processor, causes the at least one processor to perform operations according to Aspect 25.

Aspect 36. A non-transitory computer-readable storage medium comprising instructions stored thereon which, when executed by at least one processor, causes the at least one processor to perform operations according to any of Aspects 26 to 30.

Aspect 37. An apparatus for wireless communications comprising one or more means for performing operations according to any of Aspects 1 to 24.

Aspect 38. An apparatus for wireless communications comprising one or more means for performing operations according to Aspect 25.

Aspect 39. An apparatus for wireless communications comprising one or more means for performing operations according to any of Aspects 26 to 30.

What is claimed is:

1. A network entity for wireless communication, comprising:

at least one memory; and at least one processor coupled to the at least one memory, wherein the network entity is configured to:

determine a bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); and receive, based on the shared configured DMRS, the scheduled PDSCH transmission using the bandwidth, wherein:

the scheduled PDSCH transmission is scheduled based on downlink control information (DCI) included in the PDCCH transmission; and the DCI does not include a frequency domain resource allocation (FDRA) field for the scheduled PDSCH transmission.

2. The network entity of claim 1, wherein, to determine the bandwidth, the network entity is configured to determine the bandwidth based on downlink (DL) bandwidth part (BWP) switching information.

3. The network entity of claim 2, wherein the DL BWP switching information is indicative of a particular BWP bandwidth included in a plurality of BWP bandwidth switching candidates.

4. The network entity of claim 3, wherein the plurality of BWP bandwidth switching candidates are configured based on a radio resource control (RRC) message indicative of the plurality of BWP bandwidth switching candidates.

5. The network entity of claim 1, wherein the network entity is configured to:

receive radio resource control (RRC) reconfiguration information corresponding to a downlink (DL) bandwidth part (BWP), wherein, to determine the bandwidth, the network entity is configured to determine the bandwidth based on the RRC reconfiguration information.

6. The network entity of claim 5, wherein the DL BWP is associated with the PDSCH transmission, the PDCCH transmission, and the shared configured DMRS.

7. The network entity of claim 1, wherein the network entity is configured to:

receive radio resource control (RRC) configuration information indicative of a PDSCH bandwidth, wherein to determine the bandwidth, the network entity is configured to determine the bandwidth based on the RRC configuration information.

8. The network entity of claim 7, wherein the bandwidth is within a downlink (DL) bandwidth part (BWP).

9. The network entity of claim 1, wherein the network entity is configured to:

receive configuration information indicative of a plurality of candidate PDSCH bandwidths; and receive, via a media access control-control element (MAC-CE) or downlink control information (DCI), information indicative of a particular candidate PDSCH bandwidth of the plurality of candidate PDSCH bandwidths, wherein, to determine the bandwidth, the network entity is configured to determine the bandwidth based on the information indicative of the particular candidate PDSCH bandwidth.

10. A network entity for wireless communication, comprising:

at least one memory; and at least one processor coupled to the at least one memory, wherein the network entity is configured to:

receive first downlink control information (DCI) indicative of frequency domain resource allocation (FDRA) information, wherein the first DCI corresponds to a first downlink (DL) grant that is earlier than a second DL grant corresponding to a scheduled physical downlink shared channel (PDSCH) transmission;

determine, based on the FDRA information, a bandwidth corresponding to the scheduled PDSCH transmission, wherein the scheduled PDSCH transmission is associated with a physical downlink control channel (PDCCH) transmission, and wherein the PDSCH transmission and the PDCCH transmission are associated with a shared configured demodulation reference signal (DMRS); and receive, based on the shared configured DMRS, the scheduled PDSCH transmission using the bandwidth.

11. The network entity of claim 10, wherein the network entity is configured to apply the FDRA information after a configured delay corresponding to a processing time of the network entity.

12. The network entity of claim 10, wherein the network entity is configured to:

receive second DCI indicative of a second PDSCH transmission scheduled after the scheduled PDSCH transmission, wherein the second PDSCH transmission reuses the bandwidth, and wherein the second DCI does not include a FDRA field.

13. The network entity of claim 10, wherein the network entity is configured to:

transmit an acknowledgement (ACK) corresponding to one or more of the FDRA information or the first DCI;

determine a FDRA starting time based on a time offset from the ACK; and apply the FDRA information after the FDRA starting time.

14. The network entity of claim 13, wherein the time offset from the ACK comprises a configured number of time slots or a configured time value.

15. The network entity of claim 13, wherein, to receive the scheduled PDSCH transmission using the bandwidth, the network entity is configured to receive the scheduled PDSCH transmission using the bandwidth after the FDRA starting time.

16. The network entity of claim 10, wherein the FDRA information is indicative of a set of allocated resource blocks (RBs) for the network entity, and wherein the bandwidth corresponds to a bandwidth of the set of allocated RBs.

17. The network entity of claim 10, wherein the FDRA information comprises an index value indicative of an allocation of a particular FDRA of a configured plurality of FDRAs for the network entity.

18. The network entity of claim 17, wherein:

the configured plurality of FDRAs is associated with a subset of shared resource elements (REs); and each FDRA of the configured plurality of FDRAs includes the subset of shared REs and is associated with a corresponding DMRS sequence for the subset of shared REs.

19. The network entity of claim 17, wherein each FDRA of the configured plurality of FDRAs is associated with a fixed reference point for DMRS scrambling.

20. The network entity of claim 17, wherein the network entity is configured to:

perform PDCCH rate matching based on a starting point corresponding to the subset of shared REs associated with configured plurality of FDRAs.

21. The network entity of claim 1, wherein the network entity is configured to:

determine a timer associated with a configured default frequency domain resource allocation (FDRA) for the network entity has expired; and determine the bandwidth based on a bandwidth of the configured default FDRA.

22. The network entity of claim 21, wherein the network entity is configured to:

determine a configured periodicity associated with the configured default FDRA; and apply the configured default FDRA based on the configured periodicity.

23. The network entity of claim 1, wherein the network entity is a user equipment (UE).

24. A network entity for wireless communication, comprising:

at least one memory; and at least one processor coupled to the at least one memory, wherein the network entity is configured to:

determine a bandwidth corresponding to a scheduled physical downlink shared channel (PDSCH) transmission, wherein the scheduled PDSCH transmission is associated with a physical downlink control channel (PDCCH) transmission, and wherein the PDSCH transmission and the PDCCH transmission are associated with a shared configured demodulation reference signal (DMRS);

transmit configuration information indicative of the bandwidth;

transmit the scheduled PDSCH transmission using the bandwidth; and transmit the PDCCH transmission, wherein the PDCCH includes downlink control information (DCI) indicative of scheduling information of the scheduled PDSCH transmission, and wherein the DCI does not include a frequency domain resource allocation (FDRA) field for the scheduled PDSCH transmission.

25. The network entity of claim 24, wherein, to transmit configuration information indicative of the bandwidth, the network entity is configured to:

transmit a radio resource control (RRC) message indicative of a plurality of downlink (DL) bandwidth part (BWP) switching candidates; and transmit information indicative of a particular DL BWP switching candidate of the plurality of DL BWP switching candidates.

26. The network entity of claim 24, wherein the network entity is configured to modulate the scheduled PDSCH transmission based on the shared configured DMRS.

27. The network entity of claim 24, wherein the network entity is a base station or gNB.

* * * * *